United States Patent [19]
Rando et al.

[11] Patent Number: 5,619,802
[45] Date of Patent: *Apr. 15, 1997

[54] AUTOMATIC LEVEL AND PLUMB TOOL

[75] Inventors: Joseph F. Rando, Los Altos Hills; Christiaan Ligtenberg, Mountain View, both of Calif.

[73] Assignee: Levelite Technology, Inc., Mountain View, Calif.

[*] Notice: The term of this patent shall not extend beyond the expiration date of Pat. No. 5,459,932.

[21] Appl. No.: 342,175

[22] Filed: Nov. 18, 1994

Related U.S. Application Data

[63] Continuation-in-part of Ser. No. 178,039, Jan. 6, 1994, abandoned, and Ser. No. 248,517, May 24, 1994, Pat. No. 5,459,932, which is a continuation-in-part of Ser. No. 178, 039, which is a continuation-in-part of Ser. No. 113,773, Aug. 27, 1993, abandoned.

[51] Int. Cl.⁶ .............................. G01C 5/02; G12B 5/00
[52] U.S. Cl. ...................... 33/291; 33/DIG. 21; 356/149; 356/250
[58] Field of Search .............................. 33/276, 277, 283, 33/285, 291, DIG. 21; 356/250, 149, 138, 248, 148

[56] References Cited

U.S. PATENT DOCUMENTS

| | | |
|---|---|---|
| 2,460,836 | 2/1949 | Lovins . |
| 2,633,050 | 3/1953 | Baker ....................... 356/250 |
| 3,684,381 | 8/1972 | Zoot . |
| 3,771,876 | 11/1973 | Ljungdahl et al. . |
| 3,807,869 | 4/1974 | Hartley ....................... 33/291 |
| 3,856,409 | 12/1974 | Cindrich et al. ................. 33/291 |
| 3,897,637 | 8/1975 | Genho . |
| 3,905,707 | 9/1975 | Feist et al. ....................... 33/283 |
| 4,043,679 | 8/1977 | George et al. . |
| 4,111,564 | 9/1978 | Trice, Jr. . |
| 4,119,382 | 10/1978 | George et al. . |
| 4,221,483 | 9/1980 | Rando . |
| 4,333,242 | 6/1982 | Genho, Sr. . |
| 4,679,937 | 7/1987 | Cain et al. . |
| 4,767,208 | 8/1988 | Cain et al. . |
| 4,836,669 | 6/1989 | Teach ....................... 33/290 |
| 4,852,265 | 8/1989 | Rando et al. . |
| 4,912,851 | 4/1990 | Rando et al. . |
| 5,012,585 | 5/1991 | Dimaggio . |
| 5,075,977 | 12/1991 | Rando . |
| 5,108,177 | 4/1992 | Middleton . |
| 5,144,487 | 9/1992 | Hersey . |
| 5,159,760 | 11/1992 | Speigel et al. . |
| 5,182,863 | 2/1993 | Rando . |
| 5,184,406 | 2/1993 | Swierski . |
| 5,459,932 | 10/1995 | Kando et al. ....................... 33/291 |

*Primary Examiner*—Thomas B. Will
*Attorney, Agent, or Firm*—Thomas M. Freiburger

[57] ABSTRACT

An automatic plumb, level and pointing tool uses a visible laser diode to project light beams in two modes through two windows. In the first mode of operation, the unit is able to project a plumb-up beam and a level beam of light while resting on a surface which is as much as 5° out of level. In the second mode of operation the unit is able to project two orthogonal beams or light both approximately in the horizontal plane for aligning one or more reference lines. Accurate, low cost methods of generating level and plumb beams and planes of light are disclosed. One method uses an approximately or partially leveled platform combined with a refractive correction as a second stage. The approximate or partial leveling is done using a single wire, a coil spring or a ball-bearing gimbal pendulum element which allows the platform to partially correct for the out of level conditions, and remaining correction is provided by a weak negative lens, a weak reverse telescope or optical refraction at a liquid/air interface. An accessory is disclosed for use with the laser tool.

9 Claims, 17 Drawing Sheets

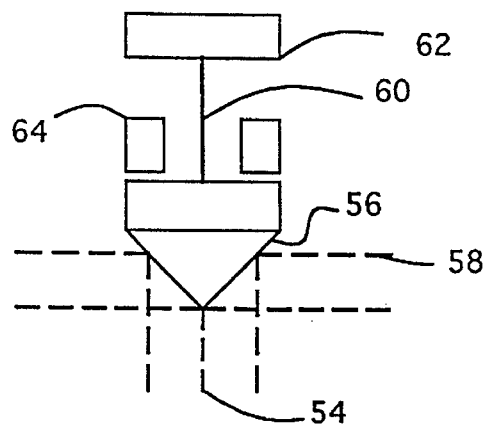
Fig. 5 ( prior art)
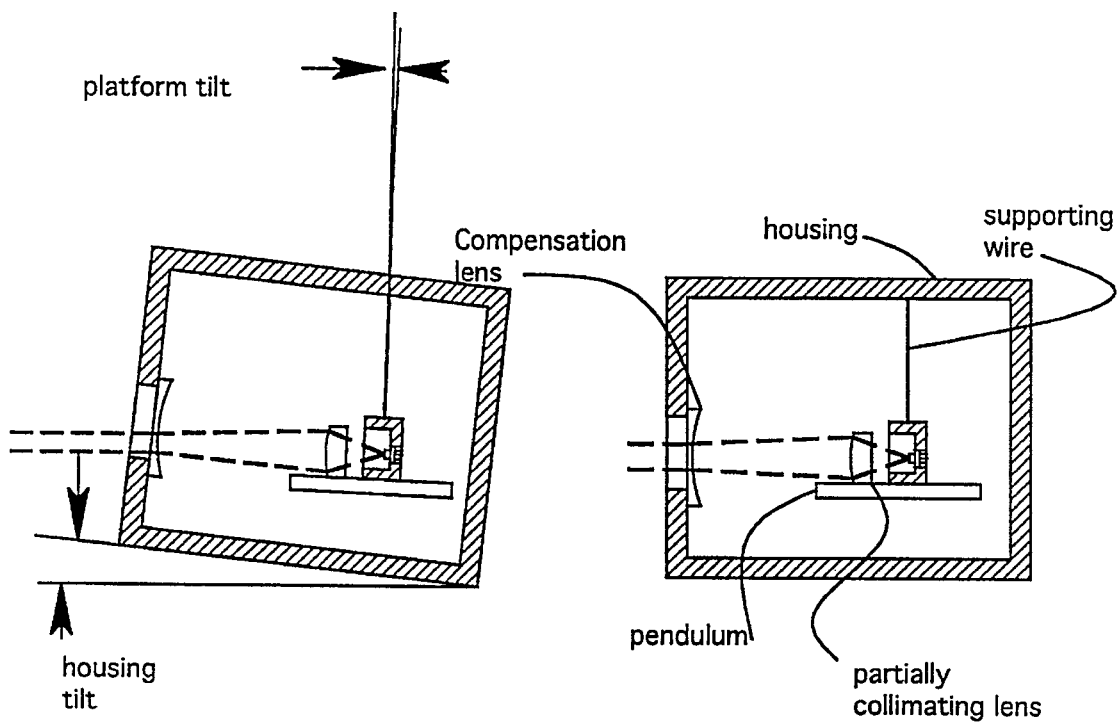
Fig. 6A
Fig. 6B

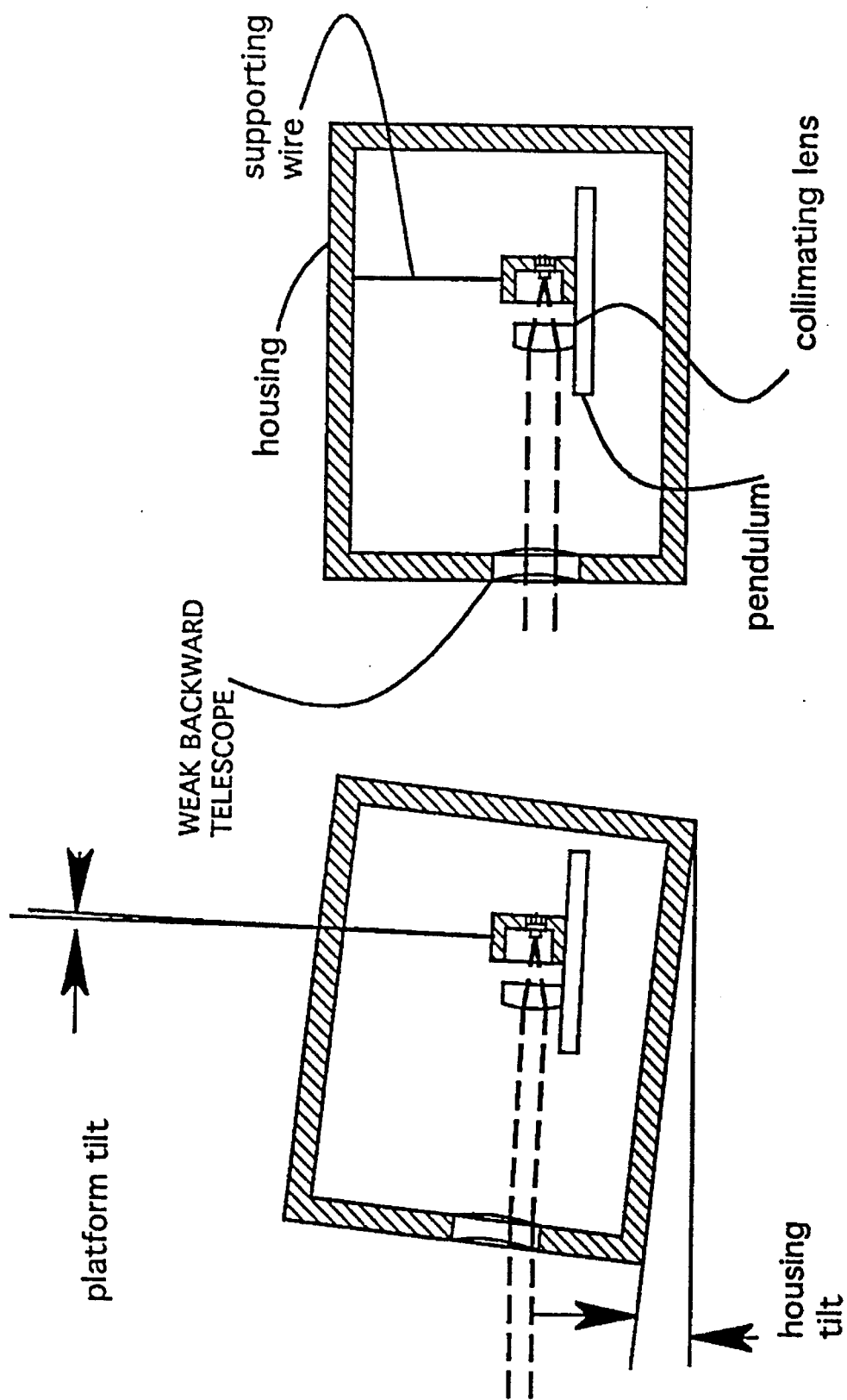

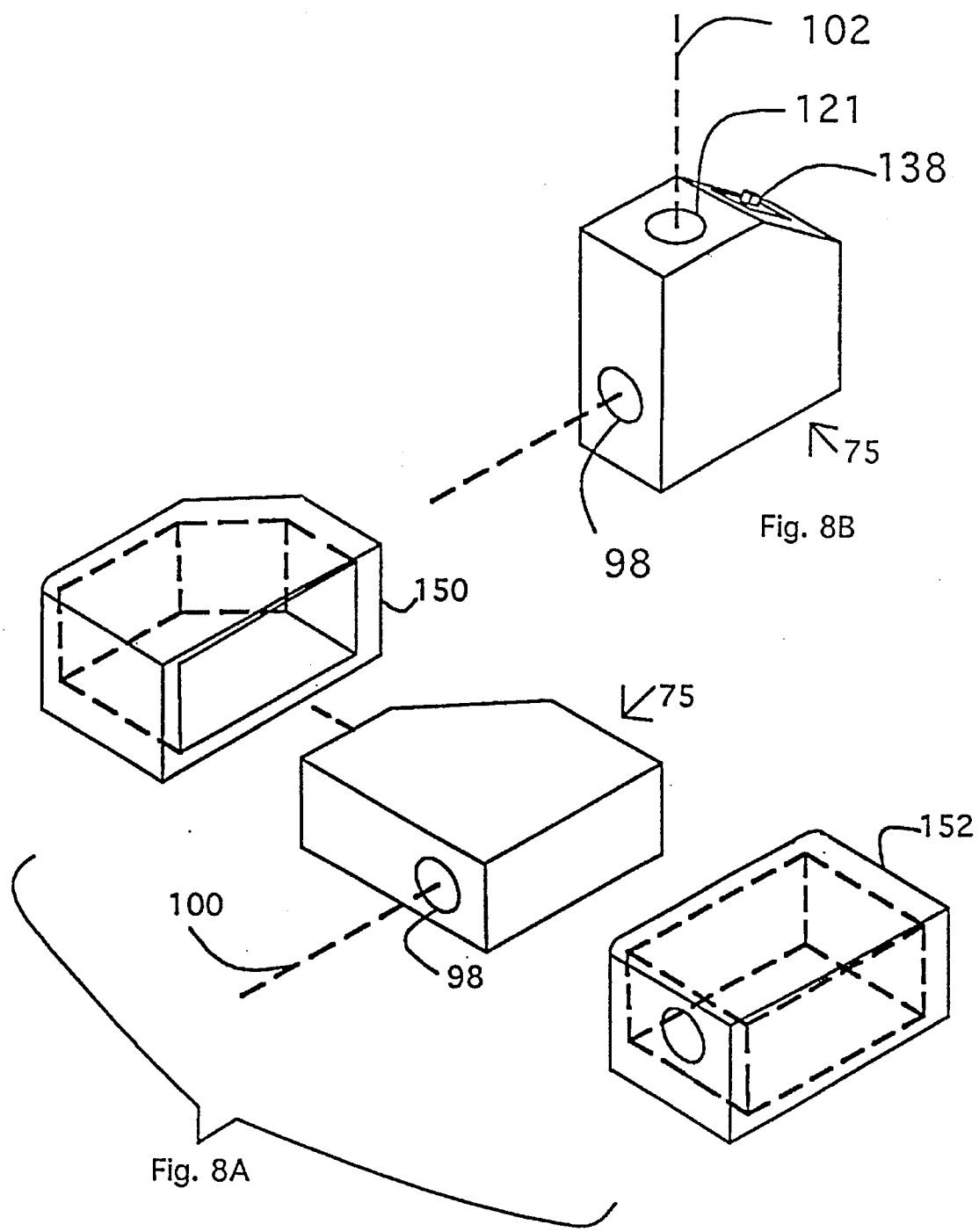

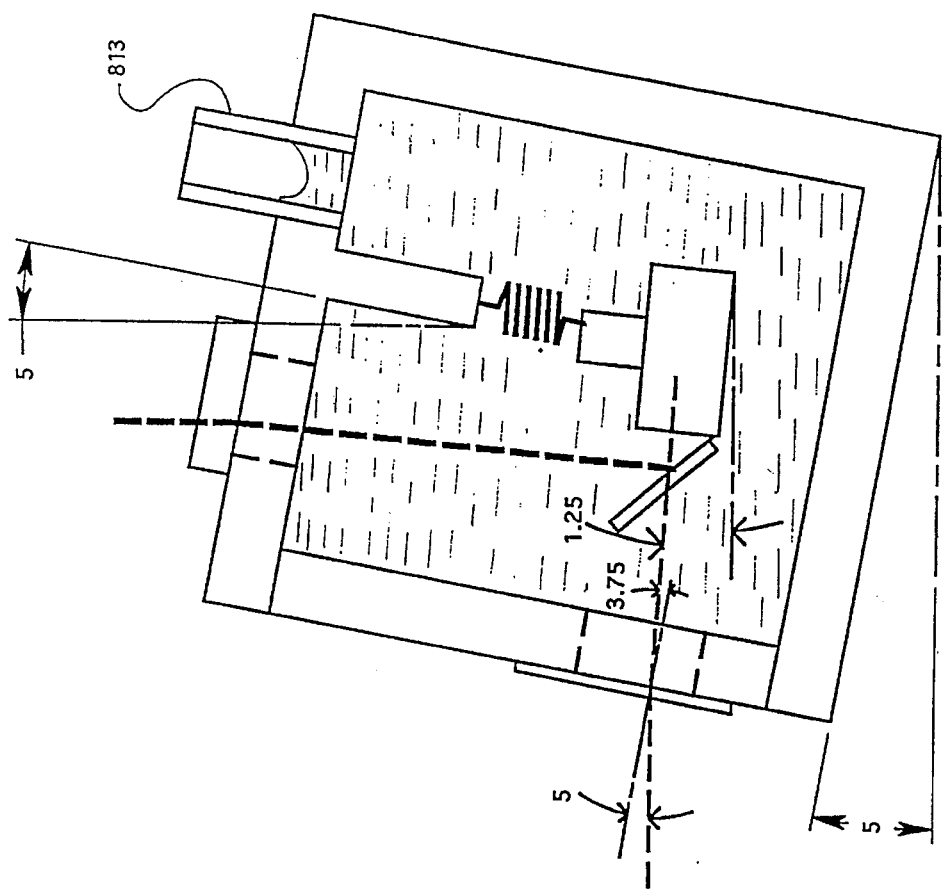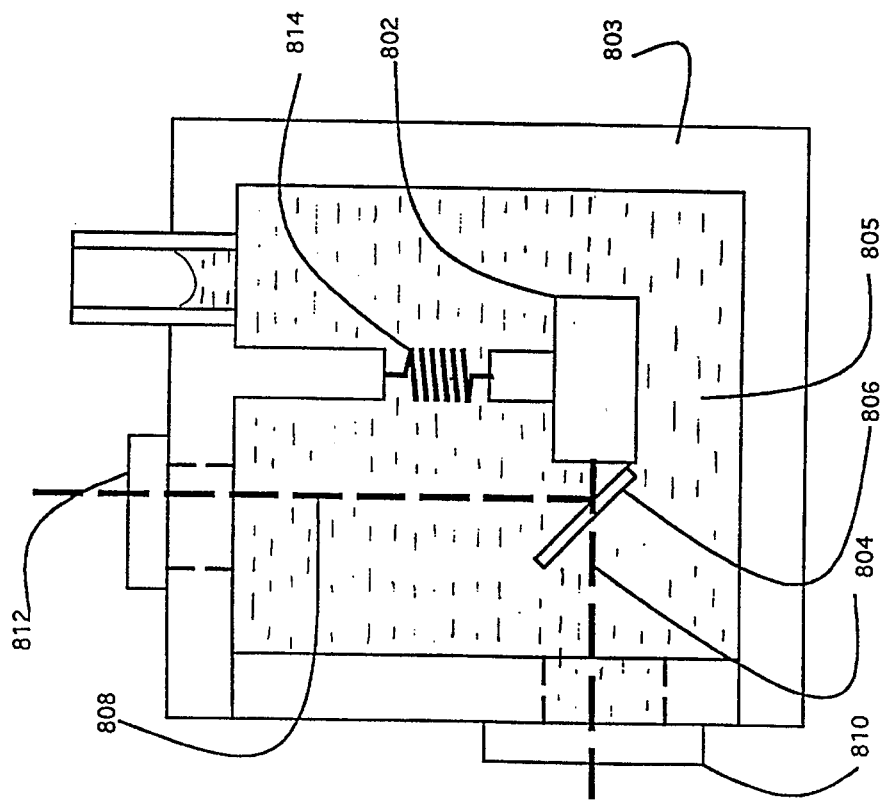

5,619,802

AUTOMATIC LEVEL AND PLUMB TOOL

REFERENCE TO RELATED APPLICATIONS

This application is a continuation-in-part of application Ser. No. 178,039 filed Jan. 6, 1994, now abandoned, which was a continuation-in-part of application Ser. No. 113,773, filed Aug. 27, 1993, now abandoned; and this application is also a continuation-in-part of application Ser. No. 248,517 filed May 24, 1994, now abandoned U.S. Pat. No. 5,459,932, which was a continuation-in-part of above-identified application Ser. No. 178,039.

BACKGROUND OF THE INVENTION

This invention relates to hand tools, and in particular the invention is concerned with a compact hand tool for projecting a plumb and level beam of visible light for precise alignment. The device projects two beams simultaneously at 90° to each other. When the tool is used in the upright position, the projected laser beams are level and plumb. When the tool is placed on its side in the horizontal plane the lines may be used to make a precise right angle as needed in construction applications. The leveling technique used combines the most attractive features of the existing leveling technology to produce an instrument with a wide self-leveling range, high accuracy over temperature, and low manufacturing tolerances. The unique method of leveling the level and plumb beams can be used with a mirrored cone to produce a plane of laser light for locating a plane in space.

A variety of survey and carpentry tools have previously employed lasers. The first laser alignment tools were manually leveled as in U.S. Pat. No. 3,897,637 and U.S. Pat. No. 3,279,070. Subsequently, self-leveling instruments were employed to improve accuracy and reliability. There are several methods electronically leveling a platform on which the laser projector is mounted. Such systems use electronic level sensors to control motors which do the actual leveling. These systems are very expensive and complex.

Automatic self-leveling has been achieved using two distinctly different methods. In a first category of leveling instrument, the entire laser is leveled by gravity. In U.S. Pat. No. 3,771,876 a He-Ne laser and chassis are hung by a flexible support to create a plumb beam which is subsequently directed in the horizontal plane using a pentaprism. FIG. 1 herein shows that system, with the laser 4 hung by a wire 2 over a pentaprism 10. The pendulous oscillation is damped out by a magnet 12. The beam exits by a window 14, while the pentaprism 10 is rotated by a motor 16.

Another platform leveling system is described in U.S. Pat. No. 5,184,406 and is shown in FIG. 2A herein. A battery operated laser diode assembly 22 is mounted to a float 26 which is supported by a liquid 28 in a vessel 24. A collimated laser beam 20 remains plumb in spite of the tilt of the vessel.

A ball bearing pendulum of U.S. Pat. No. 5,144,487 is shown in FIG. 2b. A platform 23 is suspended by a ball bearing pivot 25 within a housing 29. An optical assembly within the platform generates multiple collimated laser beams 21 for alignment purposes. The platform motion is damped by eddy currents induced by a magnet 27. The use of several ball bearings makes the instrument expensive, large and of limited accuracy and ruggedness. At tilt angles close to level the force available to overcome the friction in the ball bearings is quite small, leading to inaccuracy.

In a second distinct category of laser alignment tools, the laser is rigidly mounted to the housing of the unit and a compensation means is used to correct for the tilt or the housing. In U.S. Pat. No. 3,684,381, as shown in FIG. 3 herein, a thin film of oil 36 is used to create a correcting prism which directs the downwardly directed laser beam 32 toward the plumb direction. The oil prism is formed by the upper level of the oil which is level and a lower window 38 which is tilted. The be oil is contained by an upper window 34 and a housing 35. A laser source is mounted in a laser housing 30. This system is accurate only when two cells with oil of index of refraction 1.5000 are used. This system bas proven inadequate because the absence of a fluid with the desired properties over the normal temperature range. In addition the meniscus at the edges of the chamber contribute wave front errors. In the system of FIG. 3 a pentaprism 40 directs the plumb beam into the horizontal plane.

Several methods have been developed to tilt compensate a laser beam using wires. In U.S. Pat. No. 4,221,483 a pendulous lens hangs below a laser diode. As the housing is tilted the lens motion under gravity is proportional to the tilt angle which steers the laser beam to the plumb position. A pentaprism again converts the plumb beam to the horizontal plane. In U.S. Pat. Nos. 4,852,265 and 4,912,851 as shown in FIG. 4, a laser beam 41 is reflected from a mirror 43 on a platform 46 which is suspended from a single wire 44. The reflected laser beam 42 is compensated by the tilt of the platform under the force gravity. The length and diameter of the wire are chosen so that when the housing of the unit is tilted exactly one degree, the platform tilts exactly one half of one degree. Because of the two-to-one relationship between mirror tilt and beam correction, the laser beam is restored to its plumb direction after being tilted. These patents also show laser diodes mounted on cantilevers which respond to housing tilt to correct the output beam.

A similar technique is used to produce a plane of light in U.S. Pat. No. 4,679,937 as shown in FIG. 5 herein. A plane of light can be created by reflecting a collimated beam of light from a mirrored cone as described in U.S. Pat. No. 4,111,564. The energy center of the beam is used to define the center of the optical reference plane. A collimated laser beam 54 is reflected into a plane 58 from the mirrored surface of a cone 56 suspended from a wire 60 which is supported by the housing 62. Magnets 64 provide the damping necessary for stable operation.

The laser platform leveling techniques of the first category suffer from accuracy limitations because as the platform approaches level the force available to correct for out of level decreases. In addition an expensive pentaprism is required to produce a level beam. In the wire hung platform of U.S. Pat. No. 3,771,876 (FIG. 1 herein) the error is dependent on the degree of out of level of the housing.

The wire beam techniques of the second category require a pentaprism to create a level beam or plane of light. It is a characteristic of reflection which results in inaccuracy of the 90° deviation when the normal vector to the mirror is out of the plane of the incident and reflected beams. As a result the pentaprism and mirrored cone reflectors nave a self-leveling range of less than one half of one degree for accuracy better than 20 seconds. In addition these products bear the cost of these expensive reflectors.

An additional handicap of the instruments using tilt compensation is the need for tight tolerances in manufacturing the instruments. The requirement for a constant relationship between the platform tilt and the beam deflection defines the need for precision.

SUMMARY OF THE INVENTION

The present invention achieves high accuracy through leveling a laser projector in two stages. A pendulous wire-hung platform with a large self-leveling range and low stiffness is combined with weak tilt correction through a lens or weak reverse telescope. The laser projector and multiple beam generation optics are mounted on the platform. This platform is very close to level because of the low stiffness of the pendulum support. The small tilt dependent errors are corrected by the lenses or weak reverse telescopes mounted on the housing. In FIG. 6A a simplified version of the invention using a negative lens is shown with exaggerated angles. As can be seen from FIGS. 6A and 6B, the actual tilt of the platform from level is small compared with the housing tilt. A long focal length negative lens steers the beam back to level. Note that the laser beam between the near-collimating lens and the correction lens is converging slightly to allow the beam to be collimated after compensation. The needed correction can be obtained using a weak reverse telescope as shown in FIGS. 6C and 6D. The telescope is so short and weak that it appears as a single lens. Its image magnification is approximately 0.99 while its angle magnification in the direction used is 1.01. The beams entering and leaving the telescope are collimated. The provision of a collimated beam entering and exiting a weak telescope avoids problems of slight defocussing which will occur with a slightly converging beam corrected by a weak negative lens. It also slightly affects the degree of compensation, although it would be possible to provide a special lens which compensated for this effect. Another advantage of the use of a fully collimated beam is in avoiding any disparity in focus between the level and plumb beams. Depending on the arrangement of optics within the instrument, the plumb beam being nearer the pendulum pivot may exhibit a lesser degree of walking across the corrective weak negative lens, requiring a stronger negative lens for the plumb beam than for the level beam, for proper exit orientation of the plumb beam. This can introduce a slight focus divergence between the exiting plumb and level beams.

Consider the flexibility of the pendulum support. A support of zero stiffness always produces a level platform. A support of infinite stiffness produces no pendulum action at all. The stiffness of a pendulum with a flexible support may be described by a constant quantity, $\epsilon/\Theta$, epsilon divided by theta, where epsilon is the angle of the platform from level and theta is the housing or support tilt from level. An $\epsilon/\Theta$ equal to zero is an infinitely flexible pendulum support and a level pendulum. A pendulum with an $\epsilon/\Theta$ equal to 0.500 may be used to produce a level beam by reflecting a housing mounted laser beam from a pendulum mounted mirror. Instruments as in FIGS. 4 and 5 use this technique to produce a level beam, as shown in U.S. Pat. No. 4,912,851. In the present invention a value of epsilon over theta is approximately one half to two percent, more preferably one or two percent. In one case, the additional level correction is provided by a long focal length lens. For example when the housing is level, the pendulum is level and the beam goes through the center of the negative lens and no correction is required or provided. When the housing of FIG. 6A is one degree off level, for the case of $\epsilon/\Theta$ equal to one percent, the platform is one percent of one degree off level or 0.6 minutes off level. Since the housing is rotated one degree, the beam is now striking a different point on the negative lens. For small angles the point is R times theta in radians off the center of the lens, where R is the distance between the center of rotation of the pendulum and the lens. The focal length of the negative lens is chosen to deviate the beam the required 0.6 minutes to level. The needed relation is expressed by the relationship $R/|f|=\epsilon/\Theta$. Because only one percent of the tilt need be corrected, the tolerances for this correction are minimal. In the case of a weak reverse telescope, the angle magnification of the telescope is $1+\epsilon/\Theta$. Therefore, the lack of perfect flexibility of the support is corrected for by the reverse telescope. Conventional compensators as in FIGS. 4 and 5 using reflection of a housing mounted laser require high precision since they control the entire angle. A further understanding of the differences is to be found by considering the relative stiffness of the supporting wire in the two cases. The supporting wire in the present invention is about 80 to 100 times less stiff than a corresponding supporting wire in the second category optical compensator. The wire used in the invention acts almost as a free pendulum.

In addition to the use of a weak telescope and a negative lens, retraction at the interface between two media of different index of refraction can be used as one stage of a two-stage leveling system. The laser projector and spring are immersed in a transparent liquid. The pendulum tilts as before except now there is a buoyant force and a refraction at the exit of the containing vessel. In this case, the value of epsilon over theta for the spring and pendulum as suspended in the liquid is chosen to be $(1-1/n)$ where n is the refractive index ratio of the two media. The angle magnification previously supplied by the telescope is supplied by Snell's law. Because of the change of fluid density with temperature, the center of gravity and the center of buoyancy must be at the same location. To avoid changes in the angle correction with temperature, the reduction of the buoyant force is compensated for by the reduction in the index of refraction for the proper choice of pendulum density.

In methods of two-stage leveling described above, a spring means and an optical means were used to produce a level or plumb beam of light. Two-stage leveling may also be produced using a ball bearing means and a spring means. The first stage is a two-axis bearing or gimbal which provides the rough leveling. The second stage is an extension spring which provides the fine leveling.

Since light beams from the nearly-leveled platform are correctable to level using a lens or reverse telescope, plumb up, down, and level light beams in any direction are possible by adding beam splitters to the platform mounted laser projector. Therefore, an instrument can be built which produces many beams which are mutually orthogonal, plumb and level in several directions.

The use of a single inexpensive beam splitter in place of an expensive pentaprism is a further advantage of this invention. The calibration of the level at the factory or in the field is an important requirement for all instruments of this type. The adjustments must be easy to do, inexpensive, and reliable. In the present invention, the calibration may be done by sliding the negative lens thus steering the beam. Because of the long focal length of the lens, the calibration sensitivity is low and easy to do in the factory and in the field. A sensitivity of 40 to 80 seconds per millimeter is typical and adequate. The projected laser beams can be rough aligned using weight or by bending the beam splitter support. Fine aligning is subsequently done by sliding the negative lenses, tilting the weak reverse telescope or by shifting the center of gravity. In the case of the weak reverse telescope, the telescope may be tilted to calibrate the instrument.

Another feature of this invention is the resistance to shock and vibration which is essential in a construction product. As mentioned above only about one per cent of the housing tilt is converted to platform tilt through the weak flexure joint of the pendulum. Therefore, distortions of the structure during shock and vibrations during use will likewise have a minimal effect on accuracy. Nevertheless the pendulum is protected against shocks by providing mechanical stops in all directions. To effectively arrest the motion of the pendulum in translation mechanical stops are provided at the center of percussion which in this case is close to the center of gravity. To avoid wire damage due to shocks which might break the wire in tension, and to limit the motion of the pendulum a special caging support is provided on the pendulum. The caging support is near the center of rotation simplifying its design. In one embodiment, the wire is protected from breakage by a leaf spring at its top. Accelerations along the wire deflect the leaf spring so that the load is transferred to the stops provided for the caging-support before the forces can break the wire.

Alternately one or two extension springs can be used to support the weak bending function and shock mounting functions. In cases in which extreme accuracy is not required, this method platform leveling may be adequate for use with a collimated alignment laser beam, without requiring the second stage correction of a negative lens or weak telescope. A coil spring suspension system such as this is very inexpensive compared with alternative systems such as ball bearing pivot systems.

This same beam leveling technology is useful in generating a plane of light by mounting a mirrored 45 degree cone on the pendulous platform. In this case, the correcting optic must then be circular about the axis of the cone. The surfaces of the optic become surfaces of a torus.

An added feature of the present invention is the ability to project two beams in the horizontal plane which are at precisely 90° to each other. By placing the housing on its side the pendulum is inactive and held against internal stops by gravity. The two light beams exit the housing and may be positioned by rotating the housing. Such a feature is useful in construction for laying out orthogonal lines on a floor.

To avoid the use of the instrument outside its self-leveling range, two types of safeguards may be provided. In the first, the contact between the pendulum and rubber bumpers may be detected electrically. In the second, the base width and the location of the center of gravity are designed so that the case tips over on surfaces which exceed the self-leveling range of the instrument.

construction it is often necessary to provide a controlled slope for the flow of water runoff or to align one sloping surface with adjoining surfaces. The utility of the present instrument is enhanced by an accessory which deviates the level beam a controlled amount above or below level. For convenience the accessory may clip onto the instrument which automatically aligns the apertures and provides for easy handling and previous mounting arrangements. The continuous and accurate deviation of the level beam is accomplished by sliding two lenses equal and opposite power past each other. When the lenses are aligned there is no deviation of the beam. As one lens is moved relative to the other, the beam is deviated linearly. A scale may be integrated with the lens to allow the angle to be read directly from the location of the lens relative to the holder. The deviation angle is equal to the lens movement divided by the focal length of the lens.

DESCRIPTION OF THE DRAWINGS

FIGS. 1 through 5 illustrate principles of prior art beam leveling and plumbing devices.

FIG. 1 is a partial section view of pendulous laser projector hanging by a single support above a rotating pentaprism.

FIG. 2A is a partial section view of a laser projector on a floated platform for projecting a self-leveled laser beam.

FIG. 2B is a partial cut-away drawing of a self-leveling platform using a ball bearing pivot.

FIG. 3 is a partial section view of a laser projector and a liquid film compensation means for projecting a level laser beam.

FIG. 4 is a partial section view showing a laser projector with a wire compensation means for producing a plumb beam directly and a level beam with the aid of a pentaprism.

FIG. 5 shows a laser beam and a wire hung mirrored cone compensation means for producing a level plane of light.

FIGS. 6A and 6B are simplified drawings of the present invention showing the combination of the weak optical correction and very flexible wire self-leveling means.

FIGS. 6C and 6D are simplified drawings of the present two-stage leveling showing the combination of weak reverse telescope and very flexible wire.

FIGS. 8A and 8B are perspective views showing the instrument of the preferred embodiment projecting two orthogonal beams, with FIG. 8A showing the beams projected in a horizontal plane and FIG. 8B showing projection of a vertical and a horizontal beam.

FIG. 15A shows two-stage leveling using a spring member for first stage leveling and optical retraction for the second stage.

FIG. 15B shows a numerical example tot a liquid of index 1.33.

FIG. 16A is an enlarged view of the pendulous member while FIG. 16B is the entire instrument.

DESCRIPTION OF PREFERRED EMBODIMENTS

Figure 1:
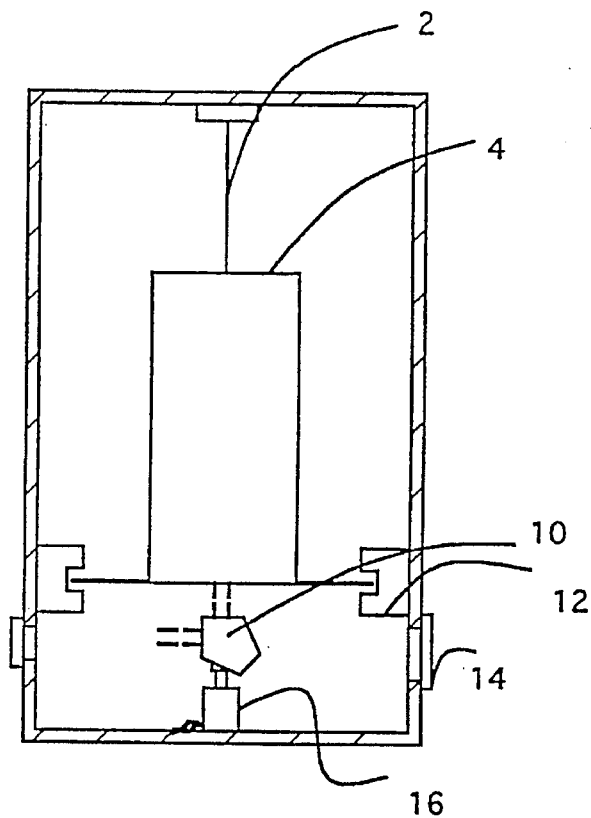
Figure 3:
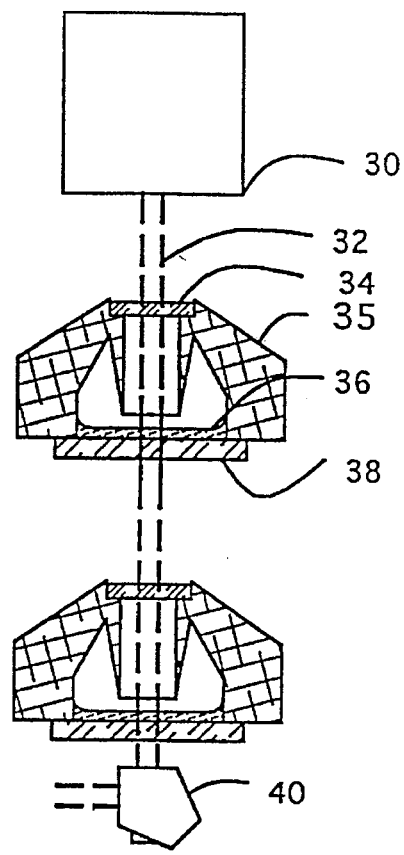
Figure 2:
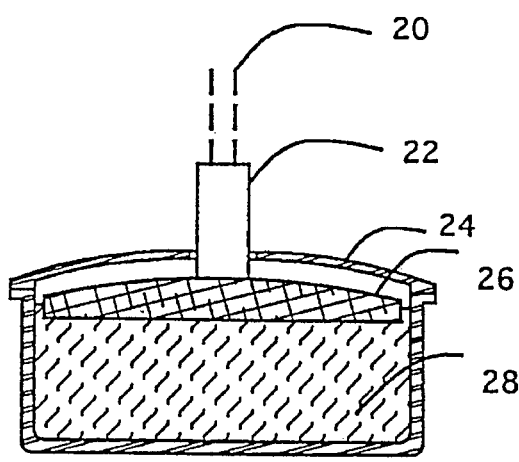
Figure 4:
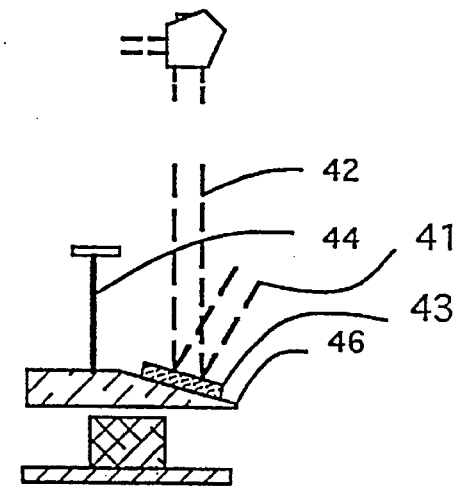
Figure 2:
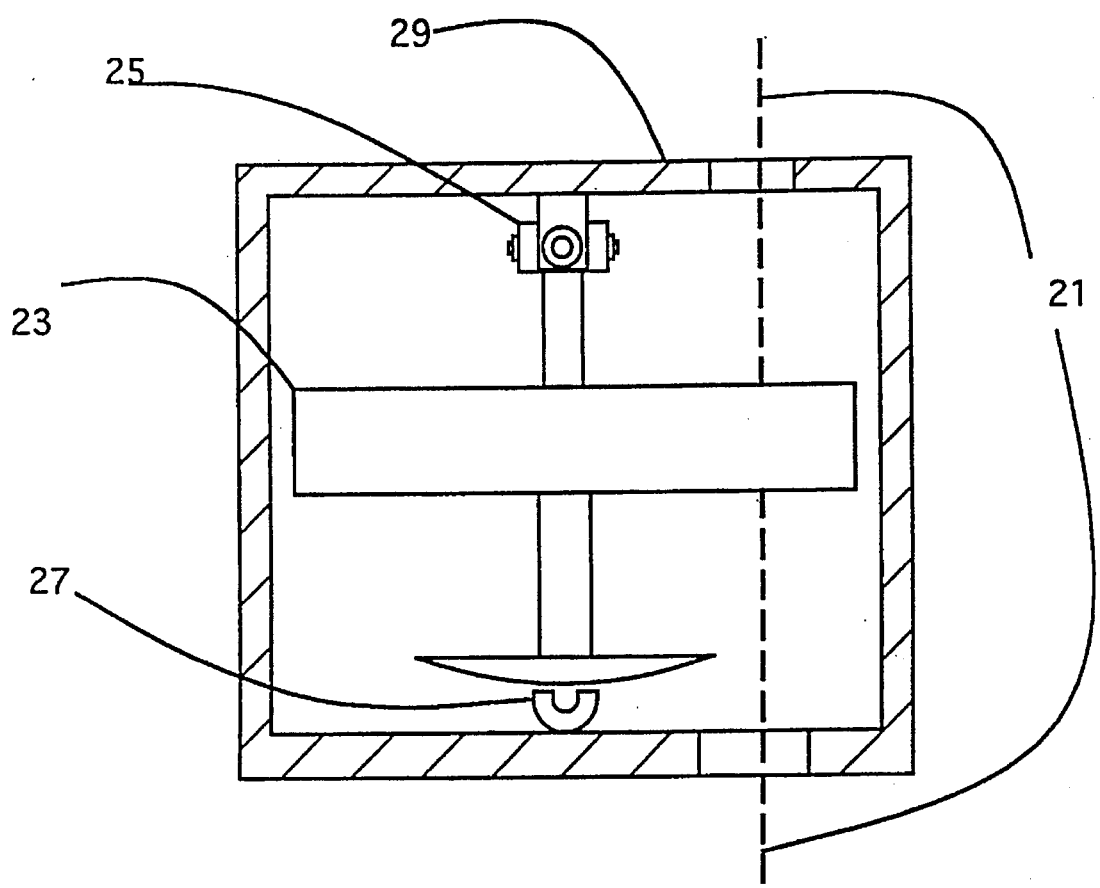
Figure 7A:
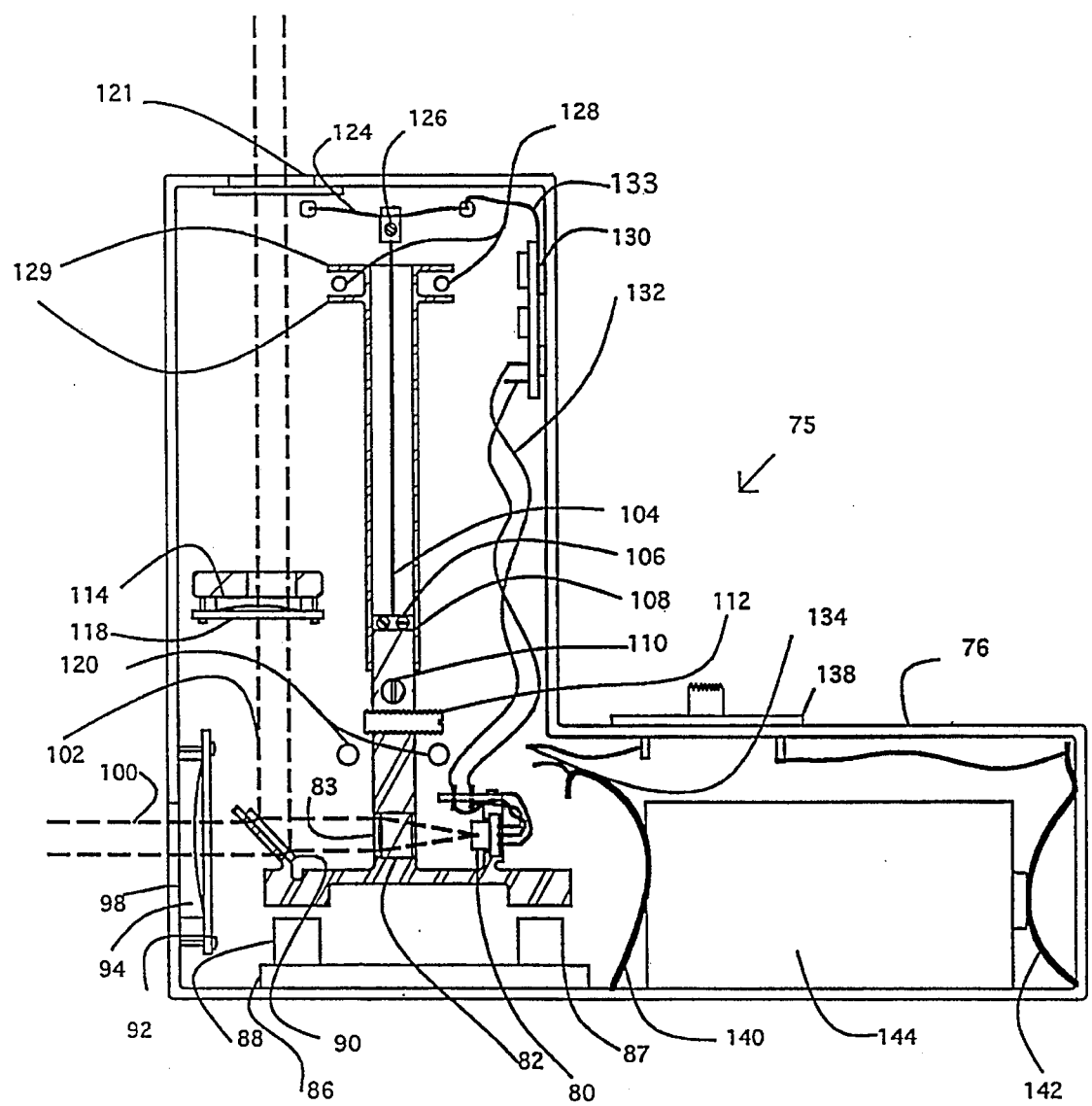
FIG. 7A is partial section view of a preferred embodiment of the invention in which the self leveling is accomplished using a very flexible wire.

FIG. 7A shows a preferred embodiment of a level and plumb tool having a case or housing 75, 76. In FIG. 7A visible laser diode 80 is mounted in an aluminum pendulum 82. The diverging beam from the laser is partially conveyed by a lens 83, although the beam continues to diverge slightly. The emerging light beam 100 is partially reflected by a beam splitter 90 creating an upwardly directed beam 102. Exit windows 98 and 121 are provided for the level and plumb beams.

The pendulum hangs by a single wire 104 whose stiffness is very low, allowing the pendulum to hang very nearly plumb when the tool 75 is tilted. Since the pendulum weighs approximately 10 grams, a 0.1 mm diameter wire, 50 mm long is sufficiently weak to allow the pendulum to hang within one per cent of the housing tilt, i.e. to have an error from plumb which is within one percent of the housing tilt angle. The wire is fastened at the top and bottom with wire clamps 126, 106. An essential feature of this design is the ability to easily and accurately adjust the level and plumb beams to the precise level and plumb. Adjustment screws 110 and 112 are used for this purpose in the illustrated embodiment. Turning the screws finely adjusts the location of the center of gravity, thus redirecting the laser beams. There are other well known methods of shifting the location of the center of gravity, such as selectively adding or subtracting weight.

Final compensation of the laser direction is provided by negative (concave) lenses 94 and 114 for the horizontal and vertical beams 100 and 102. These lenses receive the slightly converging laser beams, which are slightly out of plumb/level when the housing is tilted, and compensate their direction back to fully plumb/level (within accuracy of about 20 seconds), while also focussing each beam to fully parallel.

Further, these lenses 94 and 114 provide for fine adjustment the tool. By translating the lenses (e.g. up/down in the case the lens 94), the outgoing beams can be finely steered. Since the exit beam is collimated for the range of the instrument, the focusing of the lens 82 must be done with the negative lenses 94 and 114 in place. The lenses are held in place by clamps 92 and 118 which permit translation, i.e. sliding movement generally perpendicular to the laser beam.

High accuracy is obtained by using the correcting effect o the negative lenses, as the case is tilted, to correct for the slight lack of plumb and level caused by the stiffness of the wire. For example, if the case 76 is tipped one degree, the beam moves on the lens an amount equal to sine of one degree times the distance to the negative lens (although this distance varies with tilt, the elements of the instrument are arranged so that this variation is negligible in the correction). This amount of motion, divided by the local length of the lens, is equal to the compensation of the beam provided by the lens. For a wire stiffness sufficient to allow the pendulum to deflect one percent of one degree, the deviation of the beam going through the negative lens is one hundredth of one degree (0.01°). Although one percent has been chosen in this example, smaller or larger percentages would also provide the required compensation.

To allow eddy currents to damp the oscillation of the pendulum, magnets 87 and 88 are positioned close to the pendulum. A pole piece 86 enhances the magnetic field. Mechanical stops are provided to limit the motion of the pendulum and to protect the wire and clamps from damage due to mechanical shocks, while allowing the preferred 5° of tilt compensation in each direction. Stops 120 are positioned close to the center of gravity of the pendulum to minimize shock induced rotation. Stops 128 restrain up/down motion of the pendulum. A tubular pendulum restraint 108 prevents damage to the wire from unwanted upward motion of the pendulum by cooperating with the upper pendulum mounting. The upper wire clamp 126 is attached to a leaf spring 124 to allow downward motion of the pendulum. If the unit is dropped, the force on the pendulum deflects the leaf spring allowing a pair of flanges 129 at the top of the pendulum restraint 108 to make contact with the stops 128 before the tension in the wire is high enough to cause any damage to the wire.

A battery 144 is held in place in the case 76 by a spring 140 at the rear and a spring 142 at the front. A switch 138 controls the flow of current to a lead 134 whose connection to a circuit board 130 has been omitted to reduce the complexity of the drawing. The circuit board 130 is mounted to the housing 76 and drives the laser diode 80 using three electrical leads. The supporting wire 104 may be used as one of these leads, connected to the circuit board by a lead 133. Leads 132 are fine copper or gold wires which convey power to the diode. The wire diameter is less than 25 microns to avoid any mechanical forces which might disturb the pendulum. In addition, the length of the wire is relatively long to reduce the effect of any mechanical forces which do exist. The mechanical forces may be further minimized by attaching the electrical leads closer to the pivot point and subsequently connecting them to the laser diode. Such wires have resistance which is sufficiently low that there is negligible power loss in the wire. Although the circuit has been mounted on the housing with diode control wires connected to the pendulum it is acceptable, as an alternative, to mount the drive circuit on the pendulum and convey the power leads in the manner described above.

Figure 7B:
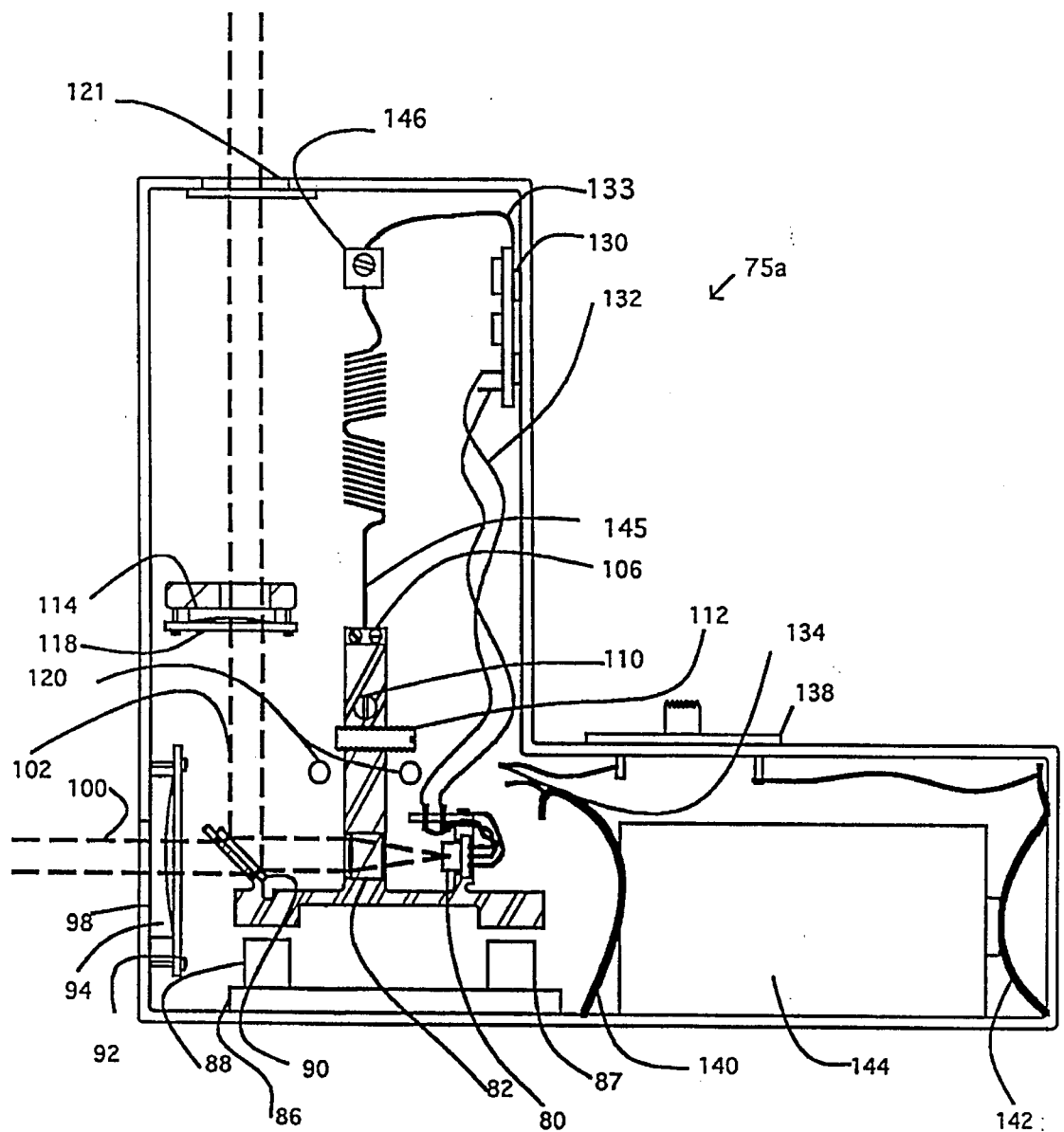
FIG. 7B is a view similar to FIG. 7A but showing a modified embodiment in which the self leveling is accomplished using an extension spring.

In the preferred embodiment of FIG. 7B an extension spring 145 provides the platform self leveling as well as the required shock mounting. It is fastened to the housing using a clamp 146. The extension spring is designed to deflect approximately 99 percent of the housing tilt angle, as is the wire described above. The compliance of the spring along the axis of the spring allows the instrument to be dropped along this axis without serious damage. The critical spring fastening, therefore, does not experience high shock forces. To minimize twist in the pendulum due to inadvertent off-axis location of the center of gravity, the extension spring is wound with right hand and left hand sections. This also minimizes or eliminates rotation of the pendulum under changing temperature conditions.

FIGS. 8A and 8B show the instrument 75 used in two modes of operation. In FIG. 8A the unit is projecting two laser beams at precisely 90° to each other. The unit includes restraint or caging (not shown in this figure) tot the pendulous mount, for the mode of operation wherein it is laid on its side, in which no leveling function is needed. The unit in FIG. 8B is projecting a plumb and level beam of light. The numbered parts correspond to the same numbers of FIGS. 7A and 7B.

FIG. 8A also indicates schematically a feature of the instrument which preferably is included to protect the instrument and its accurate operation from damage due to impact. A rubber or rubber-like elastomeric casing is shown as two separable portions 150 and 152 in FIG. 8A. The two portions assemble over the instrument to provide a relatively thick, cushioning and shock absorbing cover which prevents damage from dropping or other impact. The protective cover can be formed in other configurations than that illustrated, and can be held to the instrument's housing by adhesive or mechanical fasteners.

The invention provides a self-leveling platform which can be used in several ways to generate optical reference lines and planes. These lines and planes of light can be finely adjusted using optics as described above and are not limited to the simple plumb line or level line.

Figure 9:
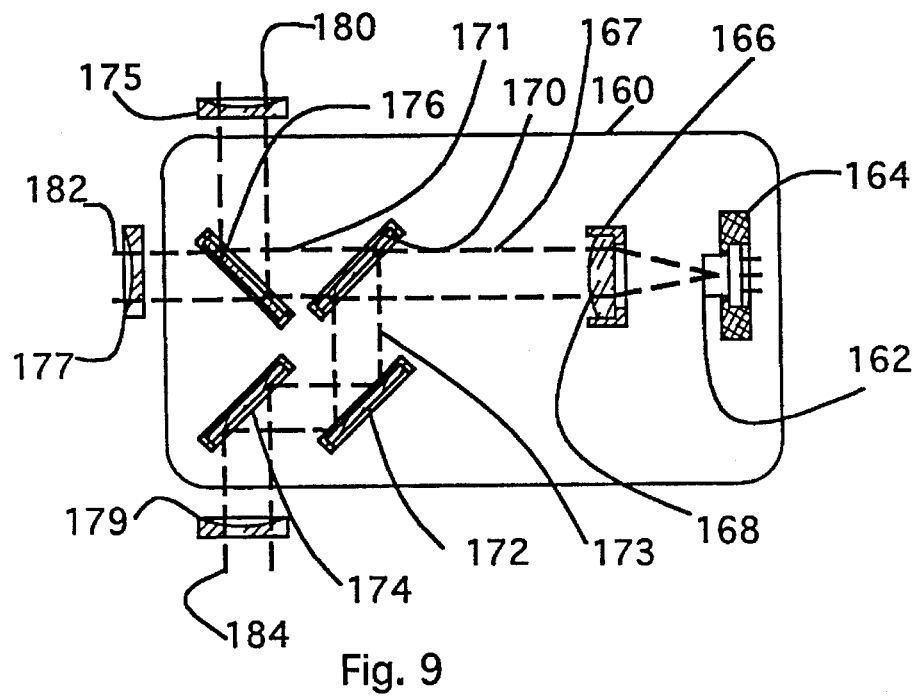
FIG. 9 is a simplified drawing of an embodiment of the invention which produces multiple alignment beams in three orthogonal directions.

In an alternate preferred embodiment shown schematically in FIG. 9, two plumb light beams and a single level beam may be projected simultaneously as may be needed for special alignment requirements. The two plumb beams may be collinear (or two level beams could be collinear). The invention functions as in the embodiment described above, with suspension (not shown) as above, except for a modified mirror arrangement. One preferred modified arrangement is shown in FIG. 9. A laser diode 162 is mounted in a mount 164 and projects a light beam 167. A lens 168 is mounted in a focusing stand 166 for focusing as described above. A beam splitter 170 transmits about 66 percent of the light while reflecting 33 percent of the light. The transmitted beam 171 is subsequently divided by a beam splitter 176 to create a plumb up beam 180 and a level beam 182. A reflected light beam 173 is further reflected by mirrors 172 and 174 to create the plumb down beam 184. In this way three orthogonal beams are formed or two collinear beams and an orthogonal third beam. A platform 160 supports this optical assembly which is mounted to a magnetically damped pendulum as described above. In a like manner, an optical assembly can be constructed to produce three level beams which are all in the horizontal plane. It is clear to those skilled in the art that this method can be extended to producing five light beams which are level or plumb and collinear.

Figure 10:
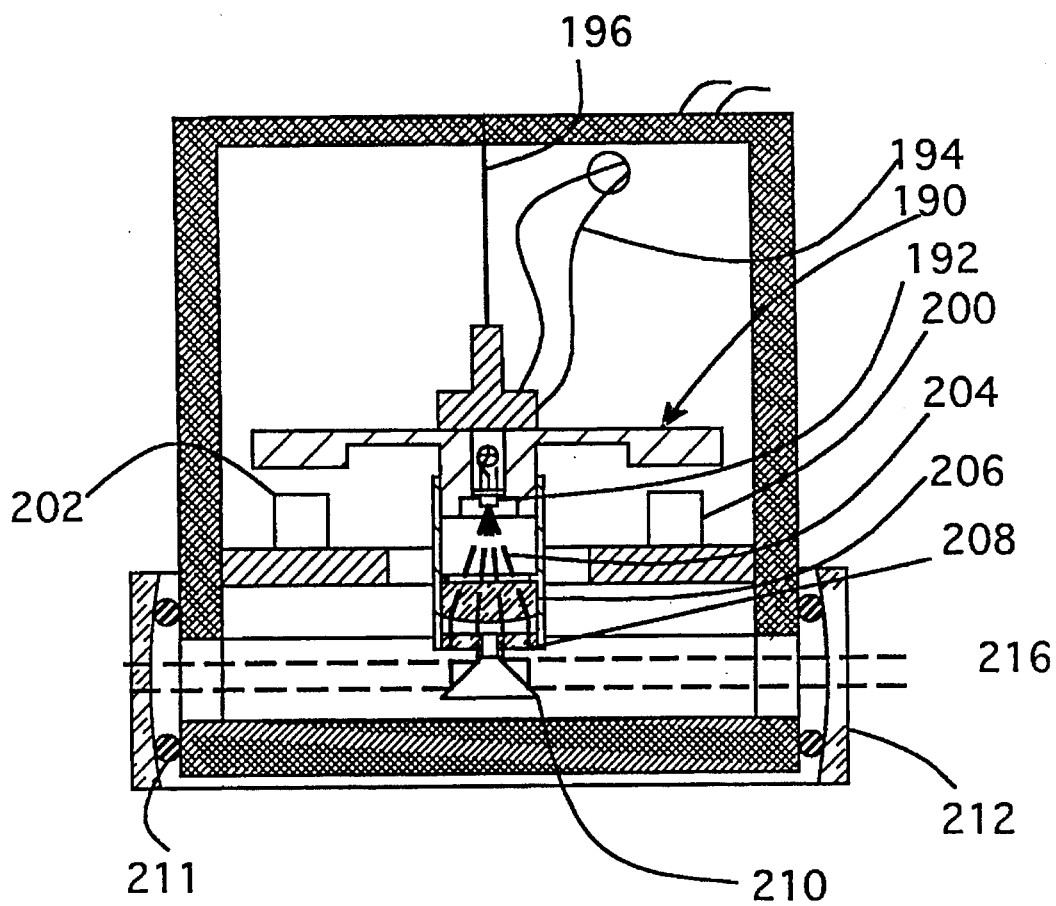
FIG. 10 is a simplified drawing of an embodiment which produces a plane of light.

In a further embodiment of the self-leveling platform combined with optical compensation, a plane of light can be generated using a mirrored cone as shown in FIG. 10. A laser diode 192 is mounted in a pendulum 190 which is supported by a wire 196. The diverging beam from the laser diode is partially collimated by a lens 206 and is transmitted through a window 208. Subsequently it is reflected by a mirrored cone 210 (which swings with the pendulum), emerging slightly converging, and redirected and focused by the negative optical power of a surrounding plastic cylinder lens 212. A plane of light 216 emerges through the plastic cylinder directed away from the instrument in all directions. The plane of light can be finely leveled by tipping the cylinder in a analogous manner to the methods described above. In the weak reverse telescope implementation of two-stage leveling, the weak negative toroidal lens is replaced by a toroidal reverse telescope. In this case the light plane approaching the weak telescope is substantially fully collimated, having the advantages described above and also below with reference to FIG. 14.

Figure 11:
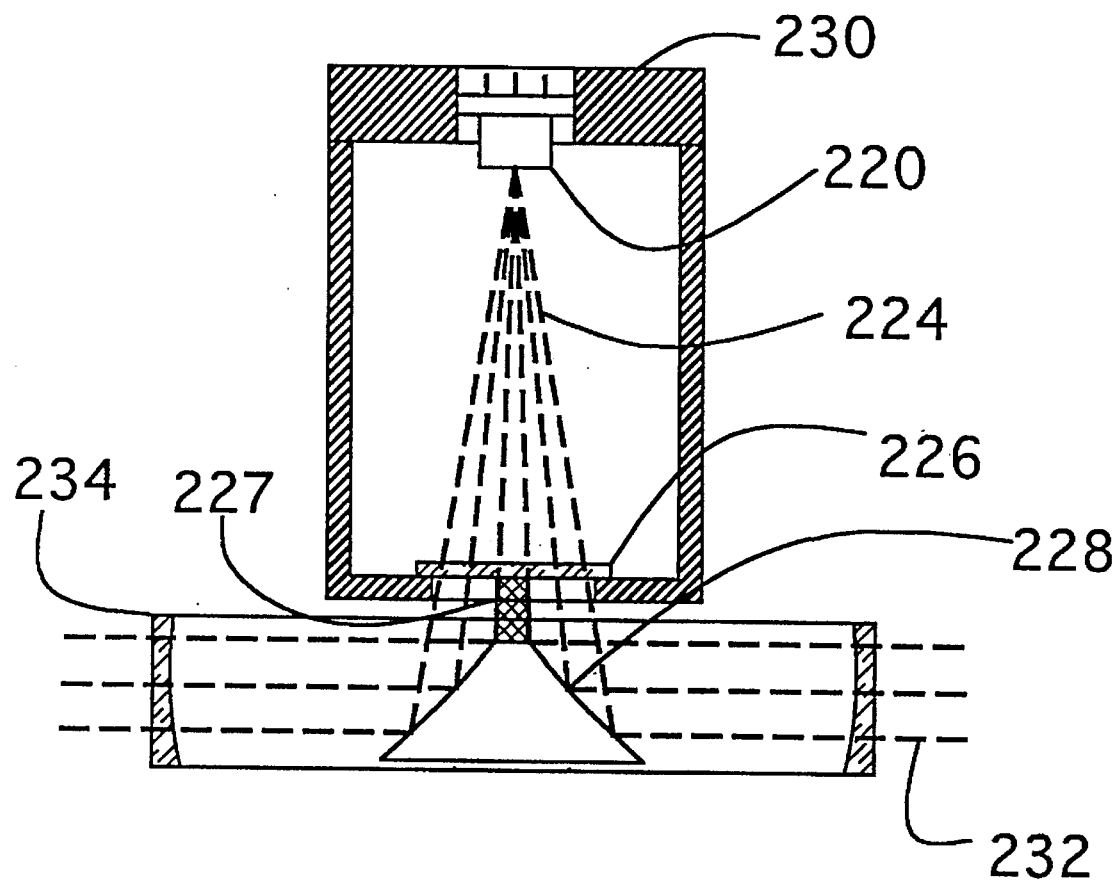
FIG. 11 is a partial section drawing showing the generation of a plane of light with one reflective element, according to another embodiment of the invention.

FIG. 11 shows an alternate embodiment of an optical subsystem which enables generating a plane of light with one optical element. An axicon reflector 228 replaces the lens and conical reflector of FIG. 10 with a single reflector element which can be molded plastic. The reduction in pendulum weight through the use of the single plastic molded reflector allows a reduction in the size of the magnet needed for damping (not shown in FIG. 11). In the optical subsystem of FIG. 11 a laser diode 220 fixed to a pendulous platform 230 (pendulum support not shown) produces a diverging beam 224 which passes through a window 226. The beam is reflected off the concavely-surfaced axicon reflector 228, which preferably produces a reflected beam plane slightly converging. A negative cylindrical lens 234, fixed to the housing and annularly shaped so as to have at least one face comprising part of a toroid, focuses the plane to parallel and also provides the slight secondary tilt correction as in the embodiments above. Thus, the lens 206 and reflecting cone 210 of the FIG. 10 embodiment are replaced by the axicon reflector 228 in FIG. 11. It should be noted that the cone 210 of FIG. 10 is a special case of a family of axicon reflectors.

Figure 12:
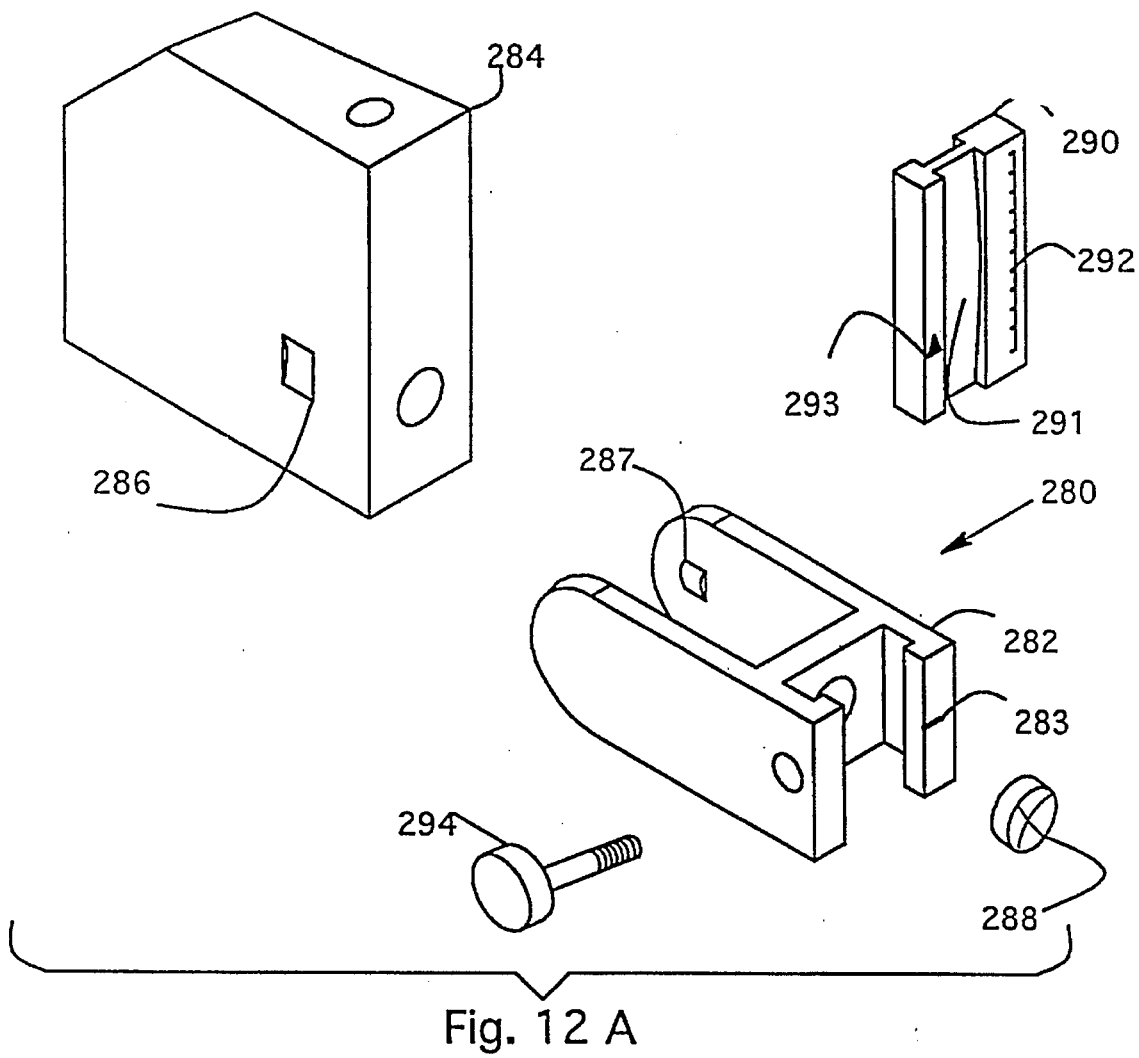
FIG. 12A is an exploded drawing of a beam deviation accessory in front of the instrument. The detail for snapping the accessory to the housing and locking the integrated lens and scale is also shown.
FIG. 12B is a front view of the beam deviation accessory mounted on the instrument of FIG. 12A showing the scale and reference mark.
Figure 12:
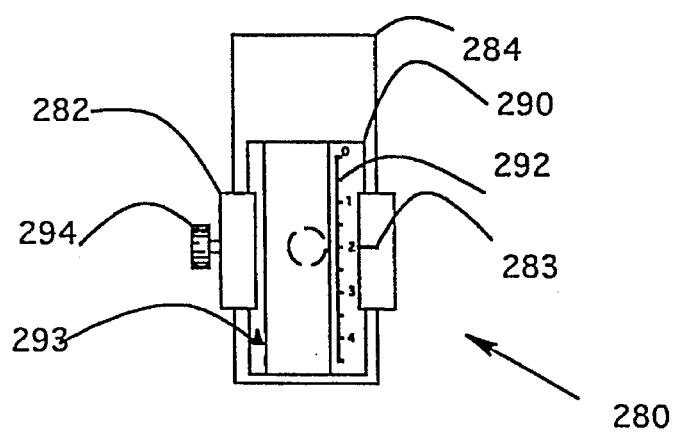

FIG. 12A snows an exploded view of a beam deviation accessory 280 and the details of its connection to an instrument the invention 284. A main structure 282 may be snapped onto the housing on the instrument by the operator using indentations 286 and corresponding protrusions 287 on the instrument and the accessory, respectively. A negative lens 288 is mounted in the main structure 282. A reference mark 283 is located on the main structure. A plastic slider 290 has a positive lens curvature 291 molded into it allowing the part to function as a lens. A scale 292 is used in conjunction with the reference mark to display the deviation of the beam passing through the negative lens and plastic slider. The arrow 293 indicates the direction of the beam deviation which can be changed by turning the slider upside down. A locking knob or screw 294 allows for easy adjustment of the beam deviation and secure maintenance of its location.

The function of the assembled beam deviation accessory is shown in front view in FIG. 12B. The deviation is changed by loosening the knob 294 and moving the slider 290 until the desired beam deviation is read on the scale using the reference mark.

Figure 13:
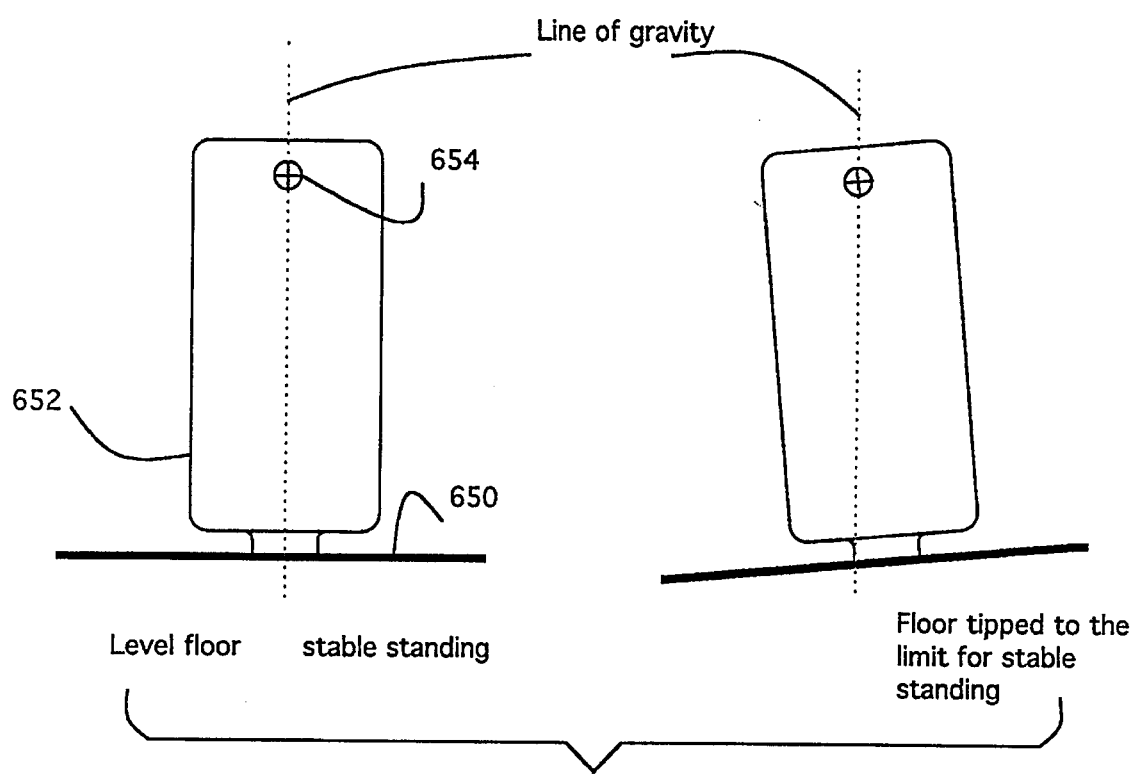
FIG. 13 shows how the width of the base and the location of the center of gravity can be used to cause the instrument to tip over automatically on surfaces beyond the instrument's self-leveling range.

FIG. 13 shows two end-views of an instrument of the invention, designated generally by 652. In the view on the left-hand side, the instrument is resting on a level surface 650 in a stable fashion with a gravitational force going through the center of gravity 654 lying within the supporting surface of the instrument. On a tilted surface, the gravitational force causes the instrument to be unstable and to tip over. In the drawing on the right side of FIG. 13, the limiting case is shown between stable standing and unstable standing which topples the instrument, preventing its use outside its self-leveling range.

Figure 14:
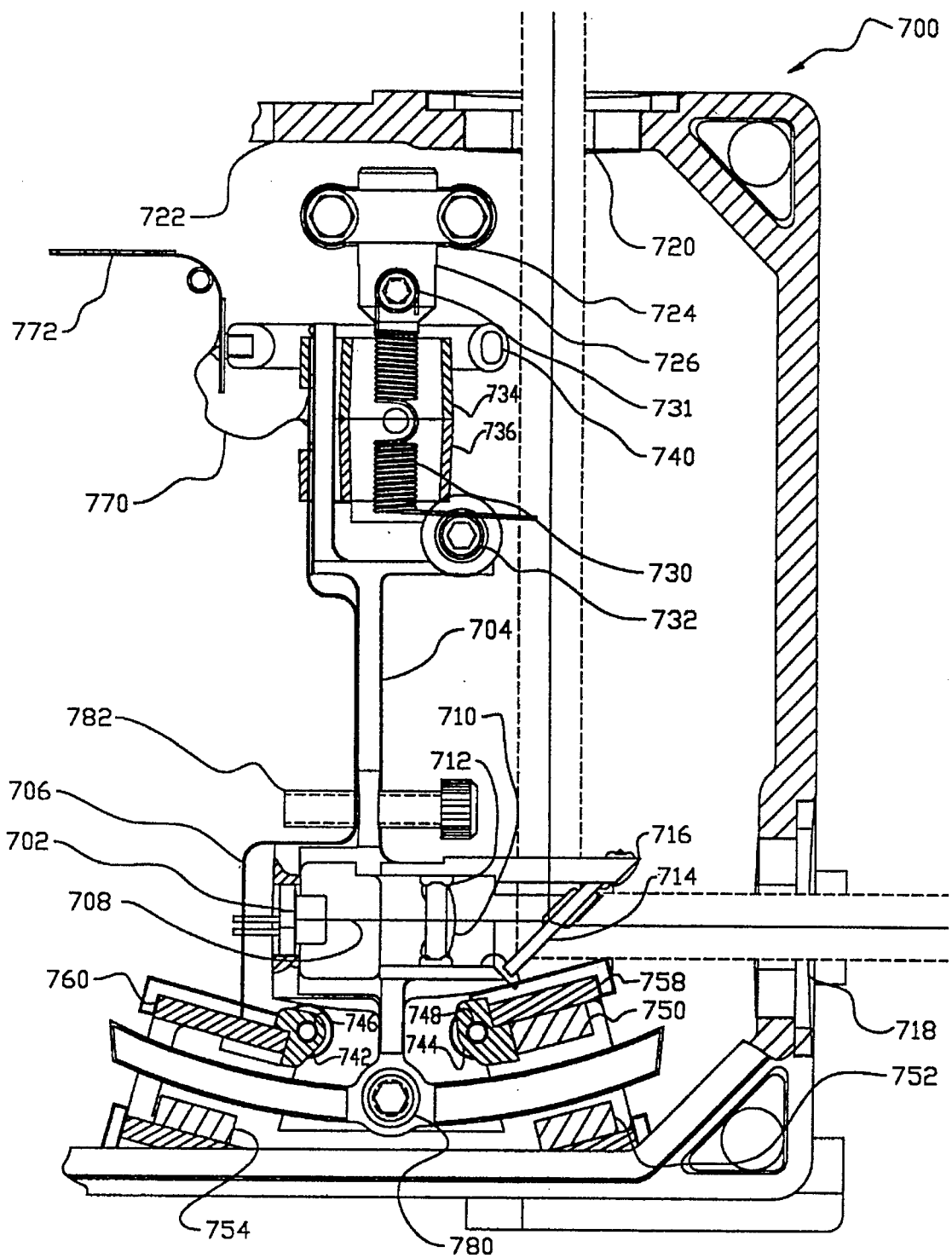
FIG. 14 shows an alternate preferred embodiment of the instrument featuring a pendulum-mounted spring restraint and weak reverse telescopes.

In a further preferred embodiment designated generally by 700 shown in FIG. 14, a laser diode is mounted in a closely-fitting hole in the pendulum 704. The power to the laser diode 702 is supplied by a flexible circuit indicated at 706, which has three conductors. The centerline of the optical beam is shown as 708. A lens 710 is held in the pendulum 704 by adhesive 712 and in this case substantially fully collimates the laser beam. A beam splitter 714 is held in place by adhesive 716. The beams proceed through the optics 718 and 720 which are plastic molded telescopes of very low power. As explained above, the use of a collimated beam passing through weak reverse telescopes, as opposed to a slightly converging beam corrected by weak negative lenses, overcomes certain problems of slight defocussing, change in the degree of compensation and conflicting focus between the emerging plumb and level beams.

The assembly is supported in a case 722 by a bracket 724 attached to the case and further by a sliding cylinder support 726. The bracket 724 has an arcuate shape which wraps around to grip the cylinder 726. This mounting arrangement permits up/down sliding adjustment as well as rotational adjustment of the pendulum 704, upon assembly of the instrument or on subsequent repair. An extension spring 730 is rigidly attached to the cylinder 726 at a flat 731 by a screw, not shown. The pendulum 704 is supported by the spring 730 with a screw 732. A spring restraint 734 and lower spring restraint 736 surround the spring and are attached to the pendulum. A rubber bumper 740 is fastened to the case 722 and surrounds the spring restraints 734 and 736. The pendulum 704 swings freely about the center of the extension spring 730 without the spring restraint touching the rubber bumper 740 as long as the case is within the self-leveling range on the instrument. During mechanical shock or vibration, the spring restraints 734 and 736 prevent the delicate extension spring 730 from receiving a damaging blow from its surroundings. The lower portion of the pendulum 704 is cushioned by rubber bumpers 742 and 744 which are supported by pins 746 and 748, respectively, from the housing. The bumpers limit the motion of the pendulum 704 in and out of the drawing as well as up and down and right to left. Permanent magnets 750, 752 and 754 are fastened to horseshoe-shaped pole pieces 758 and 760. Eddy currents in the pendulum from these magnets damp the motion the pendulum. In addition, fabrication of the bumpers 742 and 744 and also the bumper 740 above, of a conductive material (e.g. including conductive particles) will reduce the influence of static electricity on the repeatability of the instrument. It can also enable the bumpers 742, 744 to conduct a signal when the pendulum comes into contact with the bumper through an attempt to use the instrument beyond its self-leveling range. This contact between the conducting elements can be used to generate a signal to the user to the effect that the instrument is beyond its range of accuracy. The signal can comprise, for example, an illuminated LED or a modulated flashing of the laser beam.

Fine gold wires 770 connect the flex circuit 706 to the case-mounted flex circuit 772 to provide power to the laser diode 702. The wires are approximately 25 microns in diameter. Their location near the pivot point and their size limit their influence over the motion of the pendulum. The fine calibration the instrument 700 is accomplished by adjusting screws 780 and 782 which shift the center of gravity and allow the collimated laser beams to be positioned in the true level and true plumb directions.

The instrument essentially as shown in FIG. 14 can be modified to produce a plane or light, generally in the manner shown in FIGS. 10 and 11. Although such an embodiment is not specifically shown, the pendulum can be essentially the same as shown in FIG. 14, but with the laser diode 702 mounted vertically, to produce a downwardly directed beam as shown in FIG. 10. The beam can then be collimated and reflected off an axicon reflector such as the reflector 210 shown in FIG. 10. A substantially parallel plane beam then radiates outwardly to a weak reverse telescope which is cylindrical and extends around the housing of the device. In other words, the weak reverse telescope 718 of FIG. 14 is developed into a pair cylindrical lenses which have the same effect on an outwardly radiating plane beam. The embodiment of FIG. 11, wherein a concave reflector 228 is employed, can also be used with the cylindrical weak reverse telescope.

A further embodiment of a self-leveling laser beam generator is shown in FIGS. 15A and 15B, in this case employing liquid/air interface refraction of the beam as a second stage of correction.

A laser beam projector 802 shown in FIG. 15A is contained in a housing 803 and projects a horizontal laser beam 804 in a liquid 805 when the housing is truly level as in this figure. A beam splitter 806 creates a plumb beam 808. Windows 810 and 812 allow the beams to exit the housing. A spring 814 provides primary tilt correction. A fill tube 813 at the top of the housing is sealed, with an air bubble inside for accommodating thermal expansion. Alternatively, a movable expansion diaphragm can be provided at a boundary of the liquid, without any air enclosed.

Consider a numerical example shown in FIG. 15B. The liquid has an index of 1.33 (the liquid/air index ratio) which requires an epsilon over theta for the spring to be $0.25=1-1/n$. This is clear because the index multiplied times the deviation from normal at the interface will give the angle from normal at emergence into the air, from Snell's law. When the housing is tilted 5°, the beam is 1.25° above level. The angle between the normal to the window and the light beam is 3.75. The refraction at the window, as the beam emerges to the air, is a factor of 1.33 times $3.75°=5°$, from Snell's law. This deviation restores the beam to level. Since the window has parallel surfaces, its effect on the beam is inconsequential. In a like manner, the upwardly-directed beam is corrected to plumb as it emerges from the housing. This will hold true for any angle within the range of operation of the device. An advantage of using a liquid system such as this is that damping is automatic, thus not requiring the magnetic damping described above.

As noted above, the arrangement of FIGS. 15A and 15B is stable with temperature. Epsilon over theta in this case is defined not simply by the spring but by the spring and pendulum as suspended within the liquid 805. Thus, $\epsilon/\Theta$ will change with changes in temperature and the consequent change in density of the liquid, because the buoyant force on the pendulum changes with fluid density changes. The change in $\epsilon/\Theta$ is compensated for by the different refractive index ratio at emergence of the beam from the liquid. At higher temperatures, for example, the liquid will be less dense and the pendulum platform will hang closer to horizontal, in a tilted housing condition, than it would at lower temperatures. At the same time, the less dense liquid produces a lower refractive index ratio, providing less correction at housing emergence than would be the case at lower temperatures, and this is the proper direction of adjustment. By selecting the pendulum's buoyancy-to-weight ratio correctly, the changes in the $\epsilon/\Theta$ value will be balanced by changes in the refractive index ratio, through the range of operation of the device. Both effects of temperature variation are linear. For this to hold true the center of buoyancy of the pendulum must be essentially at the same location as its center of gravity, close enough not to affect the accuracy of the instrument.

Note also that the second stage of correlation in this embodiment corrects for a larger residual angle of deviation, relative to housing tilt, than do the embodiments above employing a weak telescope or weak negative lens as a second stage.

Figure 16A:
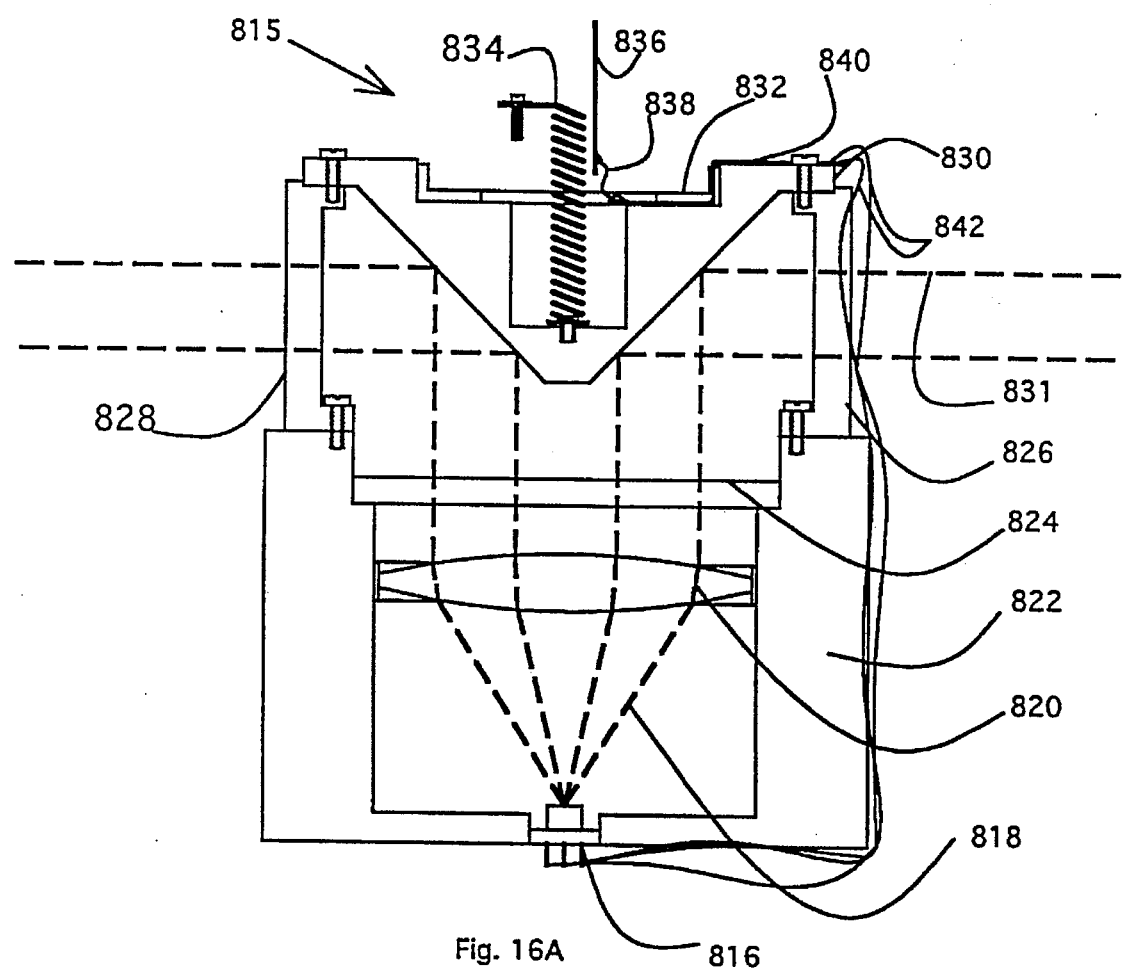
FIGS. 16A and 16B snow a two-stage laser projector capable generating a level plane of light using a retraction index and spring deflection.
Figure 16B:
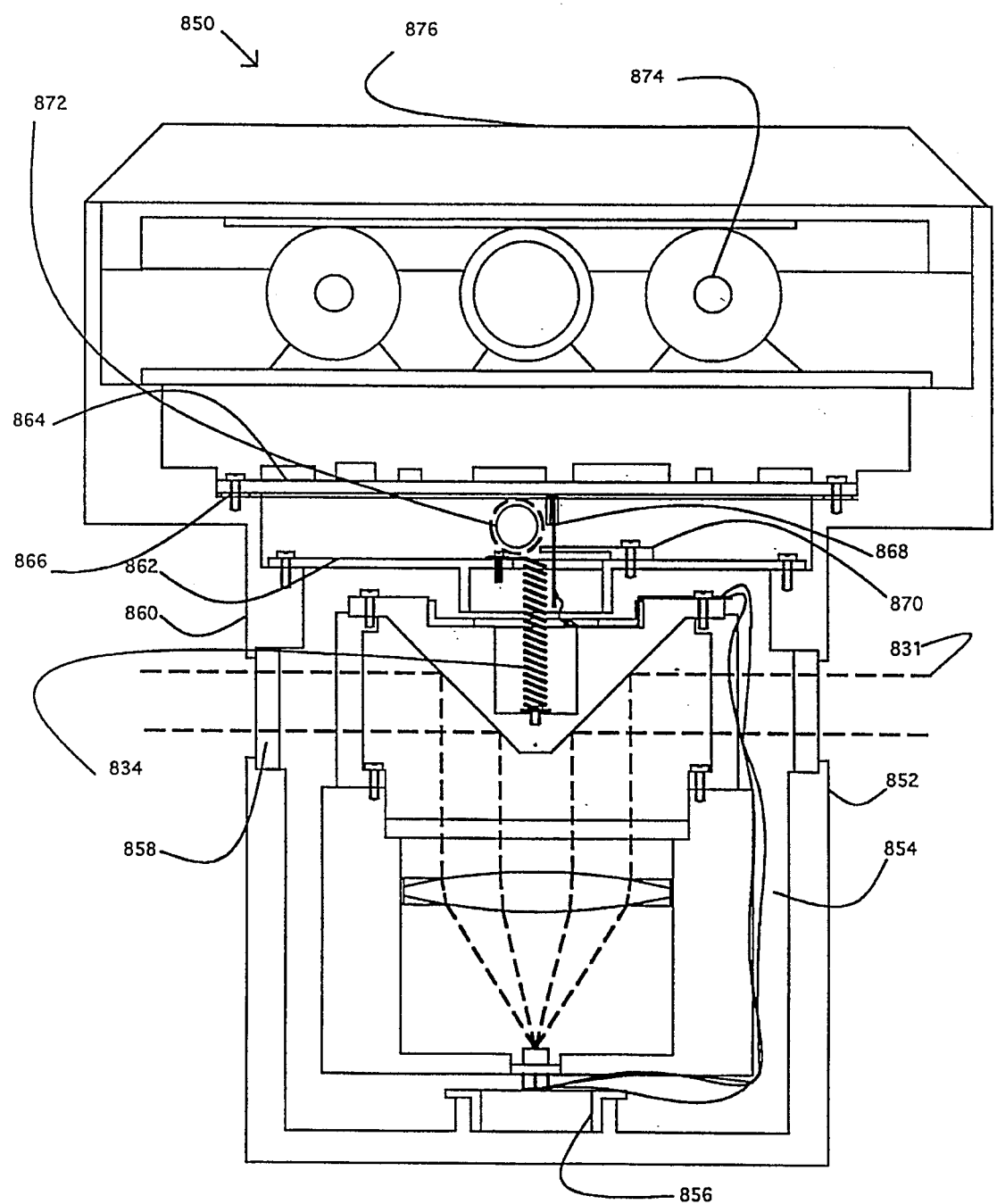

This general technique can be used to generate a plane of light using a mirrored cone and a collimated beam of light as shown in FIGS. 16A and 16B. The major advantage of this method over all existing laser plane-generating methods is its very large self-leveling range. Conventional instruments have a 0.25° range while this design has a range of 5° or more.

The pendulum is designated generally by 815 in FIG. 16A. A laser diode 816 emits a beam 818 which is collimated by a lens 820 contained in a housing 822 and sealed by a window 824. The housing is fastened by four clear plastic struts 826 and 828 to the mirrored cone 830. A plane of light 831 is projected in 360°. A rubber bumper 832 is fastened to the cone for shock mounting (see also FIG. 16B). The entire assembly is supported by a deflection spring 834. Electrical connection is made via pins 836 and flexible wires 838. Flex circuit 840 makes the further connection to wires 842 which connect to the laser diode. This assembly is shown in FIG. 16B immersed in a liquid medium 854 in a hermetically sealed vessel.

The instrument is generally designated by 850 in FIG. 16B. A lower housing 852 contains the transparent liquid 854. At the bottom of this vessel a rubber bumper 856 contains shock in the up and down directions. A cylindrical window 858 is sealed between the lower housing 852 and an upper housing 860. An upper support 862 supports the spring 834. The liquid 854 is contained by a circuit board 864 with an electrical feedthrough 868. A connector holder 870 supports the pins as they go into the electrical feedthrough 868. For liquid fill a threaded hole 872 is provided in the upper housing 860. Provision can be made for thermal expansion as in FIGS. 15A and 15B. Batteries 874 power the instrument and a cap 876 seals the upper portion of the instrument. An on/off switch and the internal wiring between the batteries and the circuit have been omitted for clarity of the drawing.

Figure 17A:
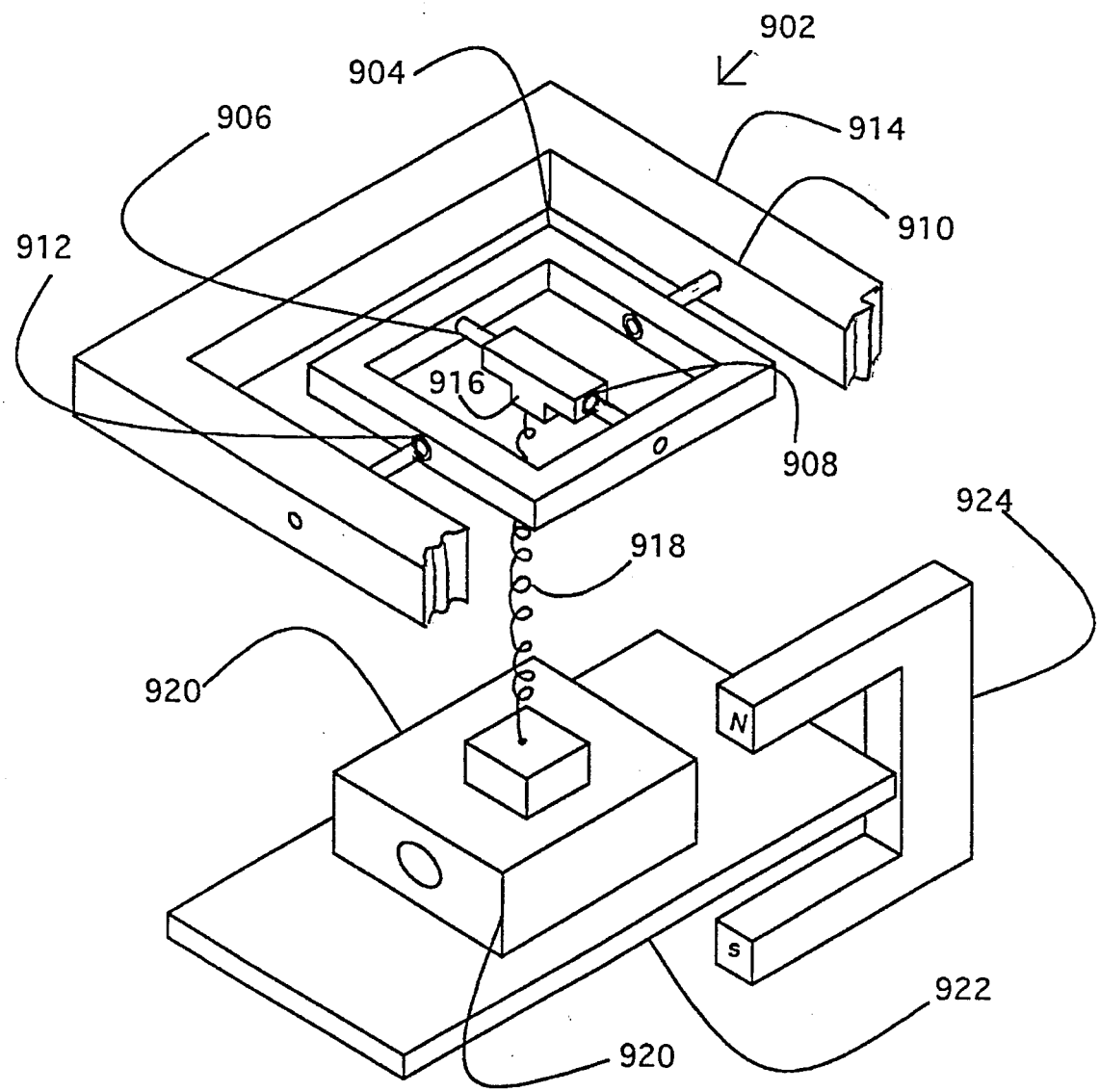
FIGS. 17A and 17B show two-stage leveling using ball bearings and spring member. Four bearings are used in FIG. 17A and two ball bearings are used in FIG. 17B.
Figure 17B:
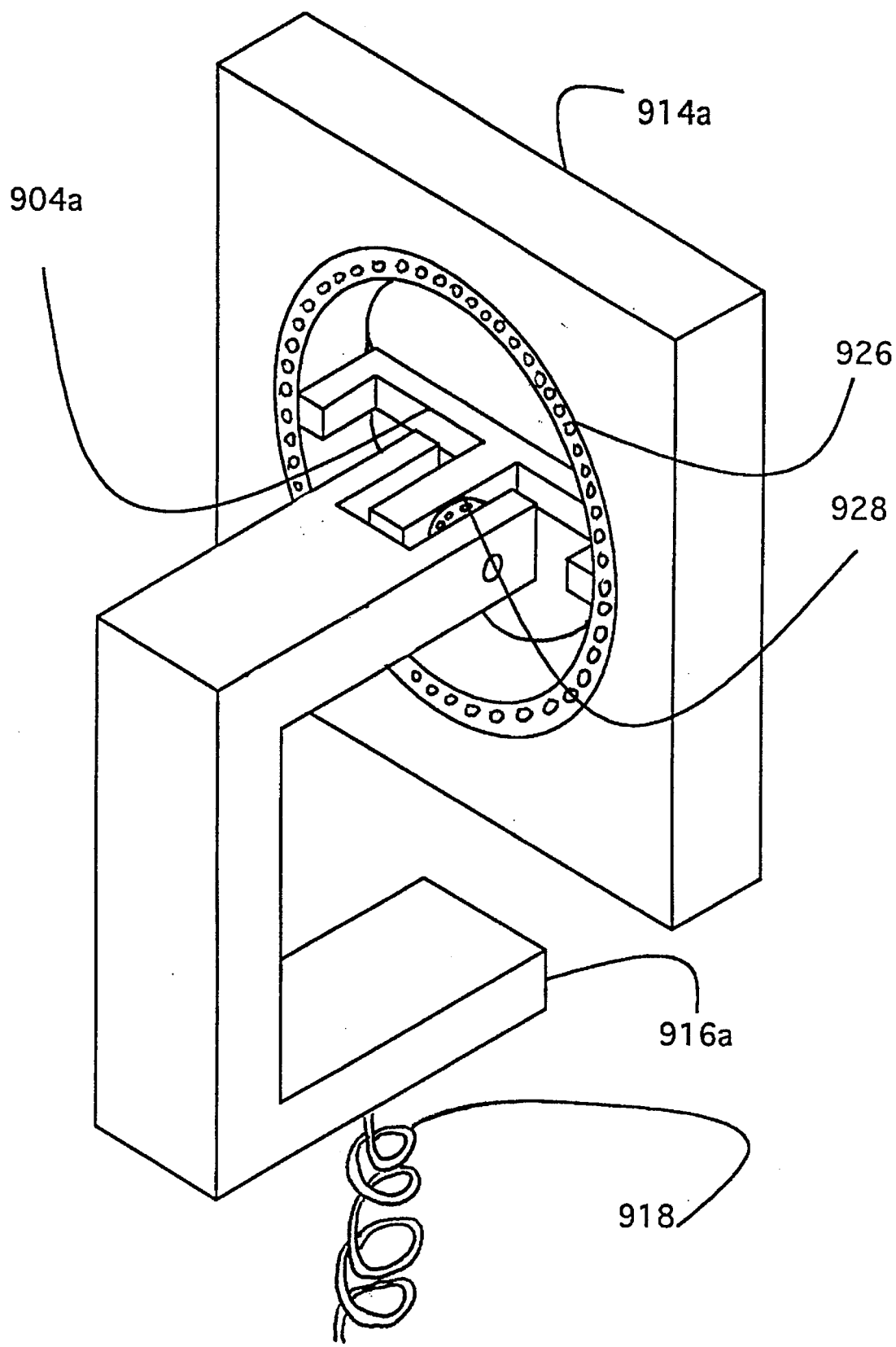

FIGS. 17A and 17B show a further type of two-stage leveling, not including any optical means of correction.

A simple gimbal as shown in FIG. 17A is an example of a first-stage leveling platform which can level to an accuracy of about 0.1° to 0.5°. Details concerning the generation of the laser beam have been omitted for clarity. The second-stage leveling system uses an extension spring with an epsilon over theta ratio of 0.01. A second example of a ball bearing first-stage leveling system is shown in FIG. 17B, using two bearings instead of four and having about the same repeatability.

FIG. 17A, the gimbal 902 has an inner frame 904 and separate sets of ball bearings 906, 908, 910 and 912. Outer frame 914 is connected to the housing. An inner element 916 gimbals to plumb. A spring 918 connects a beam projector 920 to the element 916. A damping plate 922 is connected to provide eddy current damping with the help of a magnet and pole piece 924. Under the weight of the projector 920 and 922, the element 916 hangs plumb to within 0.1° to 0.5°. The projector is then level to 0.001° to 0.005°.

The same action occurs in FIG. 17B where fewer bearings are used. Corresponding parts are numbered with corresponding numbers where appropriate. A large bearing 926 in a frame 914a supports an inner frame 904a for rotation. The inner frame 904a has a bearing 928 which rotatably suspends an element 916a, connected to the spring 918.

The term "weak lens means" as used in the claims is intended to refer to a weak negative lens (as in FIGS. 7A and 7B, for example) as a correcting optical element or a weak reverse telescope (as in FIGS. 6C–D and 14, for example) as a correcting optical element. In either case the weak lens means provides correction of the beam's alignment, in a second stage of alignment, to substantially truly level and/or plumb orientation. In the case of a weak negative lens, this element also affects the focus of the emerging beam; in the case of a telescope it does not. The term "refractive correction means" more broadly refers to the weak lens means or to the use of the liquid/air refractive index ratio as the refractive correcting stage, as described above relative to FIGS. 15A, 15B, 16A and 16B.

The above described preferred embodiments are intended to illustrate the principles of the invention, not to limit its scope. Other embodiments in variations to these preferred embodiments will be apparent to those skilled in the art and may be made without departing from the spirit and scope of the invention as defined in the following claims.

We claim:

1. A portable hand tool for projecting a laser beam in level or plumb direction, in spite of a tilted condition of the tool itself, to align the projected laser beam in two stages to substantially truly level or plumb orientation, comprising:

a housing, laser means with projection means for projecting a laser beam, pendulous mounting means secured to the housing and depending internally in the housing, for effecting a first stage of alignment when the housing is not truly level or plumb, said laser means being mounted on the pendulous mounting means such that the projected beam from the laser means is partially aligned toward level or plumb orientation when the housing is tilted, leaving a residual angle of deviation of the laser beam from a truly level or plumb orientation, and refractive correction means in the housing and positioned in the path of the laser beam, in a second stage of alignment, having optics selected for aligning the laser beam to substantially truly level or plumb orientation, by bending the path of the laser beam by said residual angle of deviation.

2. The hand tool of claim 1, wherein the refractive correction means comprises said housing defining a chamber filled with substantially transparent fluid, with the pendulous mounting means contained within the liquid, the housing having a beam exit window through which the laser beam emerges and the ratio between the index of refraction of said liquid and of air outside the housing serving to align the laser beam by refraction to substantially true level or plumb orientation as said second stage of alignment.

3. The hand tool of claim 2, wherein the pendulous mounting means with the laser means has a center of gravity and a center of buoyancy which are substantially coincident.

4. The hand tool of claim 2, wherein the pendulous mounting means with the laser means has a buoyancy-to-weight ratio selected such that with changes in temperature, resulting changes in the density of the liquid which affect buoyancy on the pendulous mounting means, will be offset by resulting changes in the index of refraction of the liquid which affect the refractive corrective means.

5. The hand tool of claim 4, wherein the pendulous mounting means with the laser means has a center of gravity and a center of buoyancy which are substantially coincident.

6. The hand tool of claim 4, wherein the housing includes means for accommodating changes in volume of the liquid contained in the chamber, which changes occur due to varying temperature.

7. The hand tool of claim 2, wherein the housing includes means for accommodating changes in volume of the liquid contained in the chamber, which changes occur due to varying temperature.

8. The hand tool of claim 2, wherein the laser means is mounted on the pendulous mounting means in generally vertical orientation such that when the housing is not truly level or plumb, the projected beam from the laser means is partially aligned toward plumb orientation by the pendulous mounting means, and including axicon reflector means fixed to the pendulous mounting means and in the path of the projected beam from the laser means, for producing generally a plane of laser light from the projected beam, projecting radially outwardly through the liquid toward said exit window, and said exit window being generally circumferential around the housing.

9. The hand tool of claim 8, wherein the pendulous mounting means further includes a collimating lens positioned to collimate the projected beam from the laser means, so that the beam reaching the axicon reflector means is a collimated beam, the axicon reflector means comprising a substantially conical reflective surface.

* * * * *